US011777384B2

(12) United States Patent
Myung

(10) Patent No.: US 11,777,384 B2
(45) Date of Patent: Oct. 3, 2023

(54) ELECTROMAGNETIC MACHINE USING MAGNETIC FIELD BINDING OF MULTIPLE MULTI-PHASE WINDING WIRES

(71) Applicant: Nam Soo Myung, Seongnam-si (KR)

(72) Inventor: Nam Soo Myung, Seongnam-si (KR)

( * ) Notice: Subject to any disclaimer, the term of this patent is extended or adjusted under 35 U.S.C. 154(b) by 73 days.

(21) Appl. No.: 17/429,539

(22) PCT Filed: Feb. 10, 2020

(86) PCT No.: PCT/KR2020/001840
§ 371 (c)(1),
(2) Date: Aug. 9, 2021

(87) PCT Pub. No.: WO2020/162734
PCT Pub. Date: Aug. 13, 2020

(65) Prior Publication Data
US 2022/0140711 A1 May 5, 2022

(30) Foreign Application Priority Data
Feb. 9, 2019 (KR) .................. 10-2019-0015246

(51) Int. Cl.
*H02K 17/12* (2006.01)
*H02K 41/025* (2006.01)
(52) U.S. Cl.
CPC .......... *H02K 17/12* (2013.01); *H02K 41/025* (2013.01)
(58) Field of Classification Search
CPC ...... H02K 17/12; H02K 41/025; H02K 11/30; H02K 17/24; H01L 2224/48091;
(Continued)

(56) References Cited

U.S. PATENT DOCUMENTS 5,898,287 A * 4/1999 Roberti .................. H02K 17/30
318/605
9,143,024 B2 * 9/2015 Kusase .................. H02K 1/276
(Continued)

FOREIGN PATENT DOCUMENTS

CN 102857001 A 1/2013
EP 3106825 A1 * 12/2016 ................ F41F 3/08
(Continued)

OTHER PUBLICATIONS

Hore, AC rotary solenoids or rotary linear stepping motor, all pages (Year: 1980).*
(Continued)

*Primary Examiner* — Naishadh N Desai
(74) *Attorney, Agent, or Firm* — STETINA BRUNDA GARRED AND BRUCKER

(57) ABSTRACT

The present invention relates to an electromagnetic machine comprising: rotation shaft; a stator comprising a multi-phase winding wire; a mover (rotor 1) comprising the multi-phase winding wire and spaced apart from the stator at a preset interval; and a controller for independently controlling a first magnetic field of the stator and a second magnetic field of the mover (rotor 1). The electromagnetic machine according to the present invention can resolve, by means of the mover (rotor 1) and the wound-type stator that can be independently and actively controlled, a torque issue at start-up or when needed and, thereby, has the effects of producing a maximum driving torque while having a minimum size, and of maximizing efficiency.

19 Claims, 11 Drawing Sheets

(58) Field of Classification Search
CPC . H01L 2224/48247; H01L 2224/73265; H01L 2924/00014; B60K 7/0007; B60K 2007/0038; H02P 1/26; H02P 2207/076; H02P 25/16; H02P 6/32; H02P 9/007; H02P 9/14; B60Y 2200/91
See application file for complete search history.

(56) References Cited

U.S. PATENT DOCUMENTS

| | | | |
|---|---|---|---|
| 2015/0349687 A1* | 12/2015 | Liang | H02P 9/007 322/61 |
| 2017/0126103 A1 | 5/2017 | Hunt | |
| 2017/0170765 A1* | 6/2017 | Blackwelder | H02P 9/08 |

FOREIGN PATENT DOCUMENTS

| | | | |
|---|---|---|---|
| GB | 1575621 A | * 9/1980 | H01F 7/145 |
| JP | 11-164536 A | 6/1999 | |
| JP | 2003-153514 A | 5/2003 | |
| KR | 10-2018-0102677 A | 9/2018 | |
| WO | 2014117350 A1 | 8/2014 | |

OTHER PUBLICATIONS

Matsui, Launching apparatus, all pages (Year: 2016).*
International Search Report for International Application No. PCT/KR2020/001840, dated May 18, 2020, 4 pages.
Dec. 2016, pp. 1-246 (Han, Yong Su. Copper Loss Minimizing Control Method of Wound Machine with Double Inverters. D .Eng. thesis, Dept. of Electrical and Computer Engineering, Seoul National University.) See pp. 5, 35, 41-50, 203-204 and figures 1.1, 2.11-2.18, 4.24-4.25.
European Patent Office, European search report for Application No. 20752221.0-1202, dated Oct. 26, 2022, 7 pages.

* cited by examiner

ELECTROMAGNETIC MACHINE USING MAGNETIC FIELD BINDING OF MULTIPLE MULTI-PHASE WINDING WIRES

CROSS-REFERENCE TO RELATED APPLICATIONS

This application claims priority to PCT International Application No. PCT/KR2020/001840 filed on Feb. 10, 2020, which application claims priority to Korean Patent Application No. 10-2019-0015246 filed on Feb. 9, 2019, the entire disclosures of which are expressly incorporated herein by reference.

STATEMENT RE: FEDERALLY SPONSORED RESEARCH/DEVELOPMENT

Not Applicable

BACKGROUND

Technical Field

The present invention relates to an electromagnetic machine using multiple multi-phase coil with magnetic field locking, in particular relates to an electromagnetic machine provided with an actively controllable rotor and stator for actively generating a rotating magnetic field for the electromagnetic machine, and by independently and actively controlling them, as a motor, it is possible to maintain field locking during the start-up, and during the regular operation, so that the direction, torque and speed can be better controlled, as a generator, it is not only capable of providing a wide operating range mitigating the instability of the power source (prime mover) and supplying stable power, but also has high efficiency with a small size and controls torque and speed over a wide range.

Background Art

In various industrial fields, there is a great demand for a bi-directional power transfer electromagnetic machine including a rotating/moving member in a system. According to the operating conditions of the system, it is a generator that converts the mechanical energy by the rotational motion of the rotating member and generates the electrical energy with this mechanical energy. Power generated from these generators can be fed or sent to power grid. In addition, it is a motor that supplies electrical energy to the machine and converts it into mechanical energy.

The electromagnetic machine used in these motors/generators is the most widely used electric device used at home and industrial sites ranging from small with a capacity of several tens of watts to large ones with a capacity of several MW, in fans, washing machines, refrigerators, automobiles, and elevators, pumps, cranes.

A great demand for such electromagnetic machines drives for not only cost reduction, but also miniaturization and light weight, especially for transportation means such as electric vehicles and airplanes.

In general, an electromagnetic machine comprises a stator and a rotor, which are separated by a small airgap. It operates on the principle that while magnetic field is produced at the airgap either by magnets or by the electrical currents in stator coils, a torque is produced in a rotor by the electrical current in the rotor interacting with the magnetic field due to the stator.

DC motors use a fixed magnetic field in the air gap and drive an armature coil to generate torque. Switching the armature requires a commutator to convert the current, induction motors have a stator with multi-phase coils that create a moving or rotating magnetic field in the air gap, and the rotor has a certain magnetic field derived from permanent magnets or electromagnets, and rotates at the same speed as the speed of the rotor shaft. In other words, conventional electromagnetic machines have a magnetic field rotation fixed to an axis.

Since a DC motor uses a mechanical rectifier (brush), regular maintenance is required, there are difficulties in high-speed operation, and the installation location is also limited. Meanwhile, since a permanent magnet is used in a permanent magnet synchronous motor (PMSM) without a mechanical rectifier, there is a concern or an issue in that the margin at maximum output is small and the magnet performance is deteriorated at high temperature.

In general, in an induction motor, the torque is generated due to the induced current at the rotor produced by the rotating magnetic field of the stator. It takes time to reach normal operation condition, and the starting torque is usually lower. In addition, a large amount of inrush current flows through the motor coil when the motor starts.

The induction motor can be largely divided into a squirrel cage induction motor and a wound-type motor (wound motor). In the case of a squirrel cage induction motor, the structure is simple, robust, easy to operate, and easy to maintain. However, due to its structural characteristics, it requires a large current to start and generates a small torque. Therefore, it is difficult to apply when frequent starting and stopping is required, or speed control is required, or the power supply capacity is small.

In addition, in the case of the wound-type motor, the starting current is small and a large torque is generated compared to the squirrel cage motor. However, there is a concern or an issue in that in order to generate a large torque, the size of the motor itself needs to be increased, which increases the cost. In addition, wound-type motors require slip rings.

BRIEF SUMMARY

Technical Subject

The present invention is to solve such problems of the prior art, and an object of the present invention is to provide an electromagnetic machine comprising a wound-type rotor and a stator independently and actively controllable.

Another object of the present invention is to provide a doubly active electromagnetic machine system that reduces the system size and weight and increases efficiency by using an electromagnetic machine including a wound-type rotor and a stator that can be independently and actively controlled.

Technical Solution

As an embodiment for achieving the above object, an electromagnetic machine according to an embodiment of the present invention comprises: a stator including a multi-phase coil; a mover including a multi-phase coil and spaced apart from the stator at a predetermined distance; and a control unit configured to control a first magnetic field of the stator and a second magnetic field of the mover, independently.

In addition, the control unit controls the first magnetic field and the second magnetic field by controlling a first current applied to the multi-phase coil of the stator and a second current applied to the multi-phase coil of the mover.

In addition, the control unit individually controls phases and amplitudes of the first current and the second current.

In addition, the control unit applies the first current to the multi-phase coil of the stator or applies the second current to the multi-phase coil of the mover by using at least one method among a direct wiring method, a slip-ring method, and a wireless inductive coupling method.

In addition, the control unit controls the electromagnetic machine at initially driven as the first magnetic field of the stator and the second magnetic field of the mover to be locked to each other.

In addition, the control unit controls moving directions of the first magnetic field and the second magnetic field in the same direction or in the opposite direction.

In addition, the mover is a rotor that is connected to a rotation shaft and rotates about the rotation shaft.

In addition, the control unit sends commands to power supply to generate signals such that desired torque and speed of the rotation shaft by individually controlling the first magnetic field and the second magnetic field with maintaining locking each other between the first magnetic field of the stator and the second magnetic field of the mover.

In addition, the electromagnetic machine is a linear electromagnetic machine or a rotating electromagnetic machine.

In addition, the stator includes a first coil arrangement, wherein the mover includes a second coil arrangement formed to be spaced apart from the first coil arrangement by a predetermined distance and having a mirror image in a spaced apart direction, wherein the first coil arrangement includes at least one first half period and at least one second half period formed adjacent to each other, wherein the first half period includes at least two coils having different current flowing directions, and wherein the first half period and the second half period have mirror images in adjacent directions.

In addition, a direction of the magnetic field formed between the two coils forming the first half period and a direction of the magnetic field formed between the two coils forming the second half period are opposite to each other.

In addition, the first half period comprises: a first layer adjacent to the second coil arrangement and comprising a first layer coil structure comprising at least two coils having different current flowing directions; a second layer disposed on an upper portion of the first layer and comprising a second layer coil structure having a same current flowing direction as the first layer coil structure of the first layer but located more outwardly than the first layer coil structure; and a third layer disposed on an upper portion of the second layer and comprising a third layer coil structure having a current flowing direction opposite to the second layer coil structure but located more inwardly than the second layer coil structure.

In addition, the first half period further comprises: a fourth layer disposed on an upper portion of the third layer and comprising a fourth layer coil structure having a same current flowing direction as the third layer coil structure but located more outwardly than the third layer coil structure.

In addition, the first half period comprises: a lower layer adjacent to the second coil arrangement and comprising a lower layer coil structure comprising at least two coils having different current flowing direction from each other; and an upper layer disposed on an upper portion of the lower layer and comprising an upper layer coil structure having a current flowing direction opposite to the lower layer coil structure.

In addition, the first coil arrangement comprises: a plurality of first half periods; and a plurality of second half periods, wherein the first half periods and the second half periods are periodically formed in adjacent directions.

In addition, the first coil arrangement or the second coil arrangement has a length being extended according to the current flowing direction, and comprises a segmented toroid current distribution or a segmented solenoid current distribution.

As an embodiment for achieving the above object, a magnetic field synchronously coupled (field locked) dual excitation electromagnetic machine system according to an embodiment of the present invention includes: a stator including a multi-phase coil; a mover including a multi-phase coil and spaced apart from the stator at a predetermined distance; and an electromagnetic machine including a control unit for independently controlling a first magnetic field of the stator and a second magnetic field of the mover.

Advantageous Effects

Accordingly, the following effects are expected through the above-described problem solving means.

An electromagnetic machine comprising an independently actively controllable wound-type rotor and stator according to the present invention can solve a larger starting torque during start-up than normal operation due to the inertia of the load and the motor itself with a rotating magnetic field generated from an independently active controllable wound-type rotor. Therefore, it is possible to devise a maximum driving torque with a minimum size, and there is an effect of maximizing efficiency. In addition, quick operation is possible in accordance with control, it has a wide dynamic range and wide safe operating range.

When a new concept double-excitation electromagnetic machine (double-fed electromagnetic machine) using an electromagnetic machine including an independently active controllable wound-type rotor and stator according to the present invention is applied to new and renewable energy systems such as offshore wind power generation, tidal power generation, wave power generation, and the like, there is an advantage in that the size can be reduced and efficiency can be increased by controlling the driving torque and speed without a gearbox.

Meanwhile, according to the in-wheel motor using an electromagnetic machine including an independently and actively controllable wound-type rotor and stator according to the present invention, after minimizing their size and by mounting them on each wheel, the driving torque and speed of each wheel are individually and efficiently controlled so that it can be applied to future electric vehicles.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
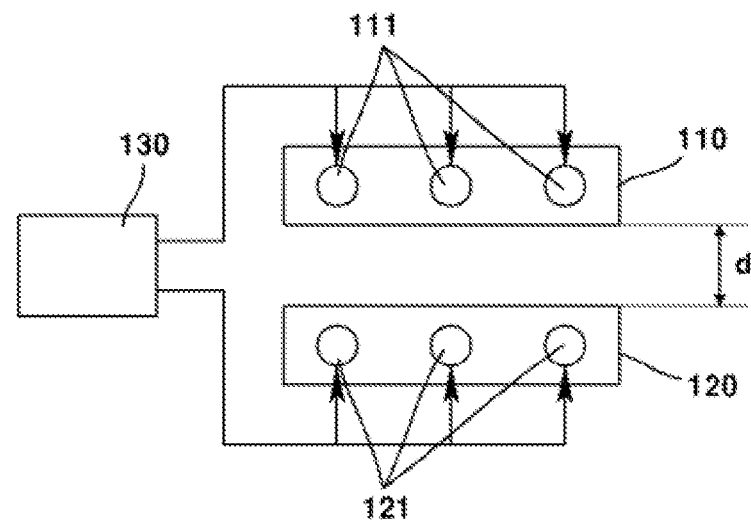
FIG. 1 is a block diagram of an electromagnetic machine according to an embodiment of the present invention.

Hereinafter, preferred embodiments of the present invention will be described in detail with reference to the accompanying drawings. Advantages and features of the present invention, and a method of achieving them, will become apparent with reference to the embodiments described below in detail in conjunction with the accompanying drawings. However, the present invention is not limited to the embodiments described herein, and may be embodied in different forms. Rather, the embodiments introduced herein are provided so that this disclosure may be thorough and complete, and the spirit of the present invention may be sufficiently conveyed to those skilled in the art, and the present invention is only defined by the scope of the claims. Meanwhile, the same reference numerals refer to the same components throughout the specification.

The terminology used in this specification is for the purpose of describing the embodiments and is not intended to limit the present invention. In this specification, the singular also includes the plural, unless specifically stated otherwise in the phrase. As used herein, 'comprises' and/or 'comprising' the recited components, steps, operations and/or elements, do not exclude the presence or addition of one or more other components, steps, operations and/or elements. In addition, since it is according to a preferred embodiment, reference signs provided in the order of description are not necessarily limited to the order. In addition, in this specification, when a certain constituent or component is mentioned or other constituents or components are not excluded, it means that other constituents or components may be additionally interposed if necessary.

The description and examples provided in this specification are presented for illustrative purposes and are not intended to limit the scope of the appended claims. This specification is to be considered as illustrative of the principles of the invention and is not intended to limit the spirit and scope of the claims and/or the scope of the described embodiments. Those skilled in the art will be able to modify the present invention for a particular application of the present invention.

In addition, the embodiments described in this specification will be described with reference to cross-sectional and/or plan views, which are ideal illustrative views of the present invention. In the drawings, thicknesses of films and regions are exaggerated for effective description of technical content. Accordingly, the shape of the illustrative drawing may be modified due to manufacturing technology and/or tolerance. Accordingly, embodiments of the present invention are not limited to the specific form shown, but also include changes in the form generated according to the manufacturing process. For example, the etched region shown at a right angle may be rounded or have a predetermined curvature. Accordingly, the regions illustrated in the drawings have general properties, and the shapes of the regions illustrated in the drawings are intended to illustrate specific shapes of regions of the device and not to limit the scope of the invention.

An electromagnetic machine according to an embodiment of the present invention includes a stator 110, a mover 120, and a control unit 130.

The stator 110 and the mover 120 include multi-phase coils (winding wires) 111 and 121, respectively, and are formed to be spaced apart from each other by a predetermined distance d. The control unit 130 independently controls the first magnetic field of the stator and the second magnetic field of the mover. By controlling the direction of the current flowing in the multi-phase coil, a magnetic field is formed by the current. By controlling the current flowing in the multi-phase coil, the movement or direction of the magnetic field can be controlled.

The control unit 130 controls a first current applied to the multi-phase coil 111 of the stator and a second current applied to the multi-phase coil 121 of the mover so that the first magnetic field and the second magnetic field can be controlled. In addition, the control unit may individually control the phase and amplitude of the first current and the second current.

The control unit 130 may control the electromagnetic machine so that the first magnetic field of the stator and the second magnetic field of the mover are bound to each other at the initial stage of driving the electromagnetic machine, and the direction of movement of the first magnetic field and the second magnetic field can be controlled in the same direction or in the opposite direction.

In here, the mover 120 may be a rotor that is connected to a rotation shaft and rotates about the rotation shaft, and the control unit 130 maintains locking between the first magnetic field of the stator and the second magnetic field of the mover, and by individually controlling the first magnetic field and the second magnetic field, the torque and speed of the rotation shaft may be controlled.

The stator 110 and the mover 120 may have a circular shape and may be formed to have a common axis. The multi-phase coils 111 and 121 arranged in a linear array can be applied to a linear motor. In addition, it can be applied to both linear and rotary electromagnetic machines.

There is a small airgap between the stator and the mover, where the mover can freely rotate about a common axis relative to the stator. When an electric current flows through the multi-phase coils of the stator, a periodic magnetic field is created in the air gap. Similarly, when current flows through the multi-phase coil of a mover, a periodic magnetic field is created in the air gap.

When the multi-phase coil of the stator is excited by a sinusoidal input current with an appropriate phase difference, a magnetic field moving in the air gap is generated, and when the multi-phase coil of the mover is excited by a sinusoidal input current with an appropriate phase difference, a moving magnetic field is created in the air gap.

When the mover moves at a constant speed with respect to the stator, the magnetic field generated by a constant current through the multi-phase coil of the mover moves at the same speed as the mover. A sinusoidal current through the mover's multi-phase coil creates a rotating magnetic field about the mover's rotation shaft. As the mover rotates, the rotation of the field in the air gap rotates at a rate determined by the combination of the field rotation speed and the shaft rotation speed.

The velocity of the magnetic field in the air gap produced by the mover with respect to the stationary coordinate system is the combination of the velocity of the mover and the velocity of the magnetic element produced by the current in the mover coil.

Multi-phase coils provided in the stator and mover means two or more individual coils where when current flows, each coil creates a periodic magnetic field in the air gap as a function of angle. It may contain an integer number of spatial periods or periods at 360 degrees. If there is more than one phase coil, the second coil is positioned offset by a fixed angle relative to the first coil. For example, for a 2-phase coil it can be shifted by ¼ period (or 90 degrees electrical angle), and for a 3-phase coil it can be shifted by ⅓ period (or electric angle 120 degrees).

By supplying currents into coils, the total magnetic field produced by all coils is the sum of the magnetic field produced by the current through each coil. By changing the amount of current in the coil, the phase and amplitude of the magnetic field can be changed.

The multi-phase current to the multi-phase coil may be supplied to the stator and the mover which rotates freely relative to the stator by slip rings or other coupling means including wireless inductive coupling. A multi-phase current may be supplied to an electromagnetic machine through fixed wires or other coupling means that allow power and control signals to be transmitted to the electromagnetic machine.

An electromagnetic machine in accordance with one embodiment of the present invention utilizes a rotating magnetic field generated by time-varying currents supplied in different phases in stator and/or mover coils. When current is applied to multiple coils, it generates integer multi-period magnetic field fluctuations.

The number of each period of the magnetic field generated by the stator and the mover may be the same. When the mover and the stator are magnetized by their respective currents, they are in magnetic field locking to each other. In other words, the mover is positioned at an angular position fixed to the magnetic field generated by the stator, and is attracted to the magnetic field generated by the mover. As the phase of the current in the multi-phase coil of the stator changes, the phase current of the mover is fixed, while the magnetic field pattern in the air gap generated by the stator moves as the phase of the current changes. As the stator magnetic field moves, the mover magnetic field moves along with it to maintain the field-lock. Similar events can occur as the stator phase does not change and the phase of the mover current changes.

When the current in the coils of the stator and mover changes the magnetic field generated by several phase coils can be moved. If the current changes in time in exactly the same way in both the stator and rotor, producing the same rotation of the magnetic field in the same way, in the same way, magnetic field locking causes the mover to rotate twice the speed of the magnetic field rotation in the opposite direction, whereas if the magnetic field rotation of the stator and mover is in the opposite direction, the mover maintains a stationary state by magnetic field locking.

Magnetic field locking is formed when the rotational speed of the moving magnetic field of the stator equals the sum of the speed of the moving magnetic field generated by the mover, which is determined by the speed and frequency of the current of the mover.

When there is an external force that pulls (attracts) the mover in the opposite direction to the mover, mechanical power is transmitted to the mover. In this case, a small phase shift occurs in electromagnetic waves and currents. The external force is balanced by the force generated by the element moving by the magnetic field and current. For example, if the stator current amplitude is fixed to create a fixed amplitude harmonic moving magnetic field, then the moving element current amplitude will be increased.

With independent and simultaneous control of phase, the frequency and amplitude of currents in the stator and mover can provide a wide range of dynamic control as well as protection of the payload and electromagnetic machine.

Figure 2:
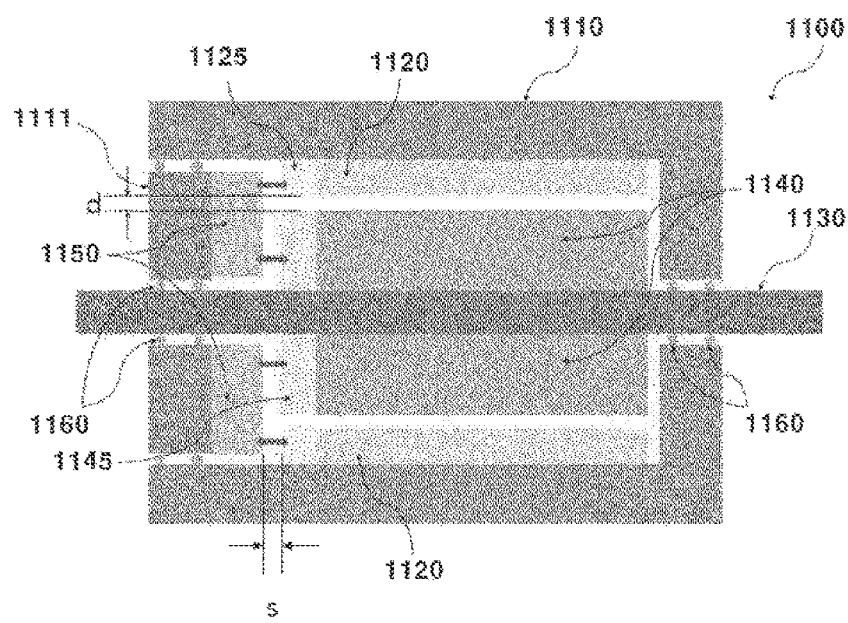
FIG. 2 is an exemplary cross-sectional view illustrating the internal structure of an electromagnetic machine according to an embodiment of the present invention.

FIG. 2 is an exemplary cross-sectional view illustrating the internal structure of an electromagnetic machine according to an embodiment of the present invention. FIG. 2 is a rotating electromagnetic machine in which a mover is connected to a rotation shaft with a rotor to rotate while maintaining a distance from the stator. FIG. 2 is an exemplary embodiment, and it is natural that the electromagnetic machine according to an embodiment of the present invention is not limited thereto.

As illustrated in FIG. 2, an electromagnetic machine 1100 according to an embodiment of the present invention may comprise a stator 1120 fixed to the inside of a case 1110, a rotation shaft 1130 passing through the case 1110, a rotor 1140 surrounding the rotation shaft 1130, a control unit 1150 placed on one end of the stator 1120 and the rotor 1140. Here, the positions of the stator 1120, the rotation shaft 1130, the rotor 1140, and the control unit 1150 inside the case 1110 are specified for illustrative purposes, but is not limited thereto and appropriate positions may be rearranged without violating the spirit of the present invention.

Here, the rotation shaft 1130 is disposed to penetrate the central portion of the case 1110 in the lengthwise direction. In addition, bearings 1160 are provided at both ends of the case 1110 on which the rotation shaft 1130 is supported. Meanwhile, a rotatable case 1111 is disposed outside the control unit 1150, so that the external power line (not shown) is not entangled during rotation. Here, the case 1110 is exemplarily illustrated to prevent entanglement of the external power line by placing the rotatable case 1111, but is not limited thereto and if the power line is supplied wirelessly or otherwise transmitted, it can also be fixed. Meanwhile, the distance s between the control unit 1150 and the stator 1120 and the rotor 1140 is necessary because one side rotates at a high speed when wireless power and signal are supplied.

In addition, the stator 1120 is attached and fixed to the inner circumferential surface of the case 1110, and the stator 1120 includes multi-phase coils (not shown). Inside the stator 1120, a rotation shaft 1130 and a rotor 1140 that shares a center with the stator 1120 and is spaced apart from the stator 1120 at a predetermined distance, that is, an air gap d, in the direction of the rotor 1130, and includes a rotation shaft 1130 are provided. Meanwhile, the rotor 1140 in one embodiment according to the present invention includes multi-phase coils (not shown).

In addition, the stator 1120 inside the case 1110, the rotation shaft 1130, and one end of the rotor 1140 include a control unit 1150 for exchanging power. At this time, the control unit 1150 may supply a first power to the stator 1120 to generate a first rotating magnetic field (not shown), and the size and frequency of the first rotating magnetic field may be controlled by adjusting the supplied first power. Here, the first power transmitted and received from the control unit 1150 to the multi-phase coils of the stator 1120 through a stator switching unit 1125 using any one method selected among a direct wiring method (not shown), a slip-ring method (not shown), a wireless inductive coupling method (not shown), and a combination thereof. In addition, the stator switching unit 1125 is a part where pulse width modulation (PWM) occurs, and may include an inverter and a converter. Here, although the stator switching unit 1125 is coupled to one end of the stator 1120 and illustrated as an example, but is not limited thereto, and the stator switching unit 1125 may be included in the control unit 1150.

In addition, the control unit 1150 may supply a second power to the rotor 1140 to generate a second rotational magnetic field (not shown) independently of the first rotational magnetic field, and the size and frequency of the second rotating magnetic field may be controlled by adjusting the supplied second power. Here, the second power Here, the second power transmitted and received from the control unit 1150 to the multi-phase coils of the rotor 1140 through a stator switching unit 1145 with any one method selected among a direct wiring method (not shown), a slip-ring method (not shown), a wireless inductive coupling method (not shown), and a combination thereof.

Meanwhile, the control unit 1150 can deliver control command to the stator 1120 using any one method selected among a direct wiring method (not shown), a slip-ring method (not shown), a wireless inductive coupling method (not shown), and a combination thereof. In addition, the control unit 1150 can deliver control command to the rotor 1140 using any one method selected among a direct wiring method (not shown), a slip-ring method (not shown), a wireless inductive coupling method (not shown), and a combination thereof. At this time, when the control unit 1150 supplies the first power and the second power to the stator 1120 and the rotor 1140, respectively, in a wireless inductive coupling method, interference can be avoided by using a frequency different from the control command transmitted by the wireless inductive coupling method.

Figure 3:
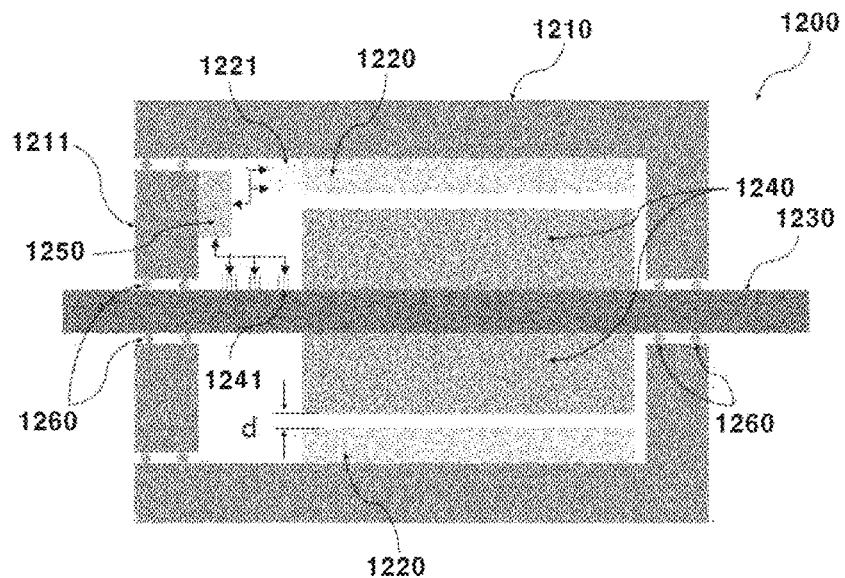
FIG. 3 is another exemplary cross-sectional view illustrating the internal structure of an electromagnetic machine according to an embodiment of the present invention.

FIG. 3 is an exemplary schematic cross-sectional view illustrating the internal structure of an electromagnetic machine including an independently and actively controllable wound-type rotor and stator according to an embodiment of the present invention.

As illustrated in FIG. 3, an electromagnetic machine 1200 including an independently and actively controllable wound-type rotor and stator according to an embodiment of the present invention may comprise: a stator 1220 fixed to the inner side of a case 1210; a rotation shaft 1230 penetrating through the case 1210; a rotor 1240 surrounding the rotation shaft 1230; and a control unit 1250 placed on one end of the stator 1220 and the rotor 1240 Referring to FIG. 3, the electromagnetic machine 1200 according to an embodiment of the present invention is an example of implementing the stator 1220 and the rotor 1240 in the control unit 1250 through a stator slip ring 1221 and a rotor slip ring 1241. Here, the control unit 1250 is exemplarily illustrated as being disposed inside the case 1210, but is not limited thereto, and the control unit 1250 may be disposed outside the case 1210.

Figure 4:
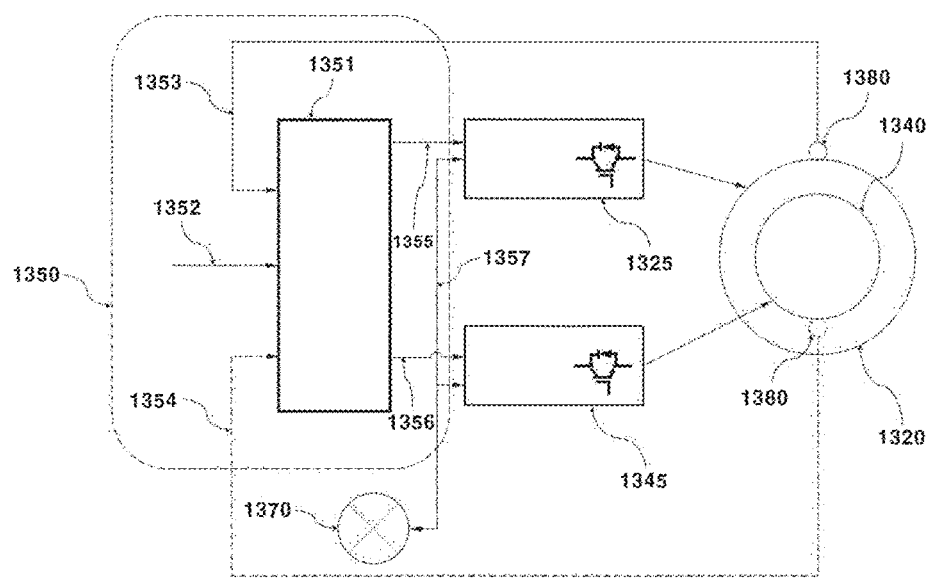
FIG. 4 is an exemplary cross-sectional view schematically illustrating driving or controlling an electromagnetic machine according to an embodiment of the present invention.

FIG. 4 is an exemplary cross-sectional view schematically illustrating driving or controlling an electromagnetic machine according to an embodiment of the present invention.

Referring to FIG. 4, in order to drive the stator 1320, when the control command 1352 of the control unit 1350 is transmitted to a stator switching unit 1325 through the control circuit 1351, a first rotational magnetic field (not shown) is generated by supplying first power from the power supply/grid 1370 to the multi-phase coils (not shown) of the stator 1320 through the stator switching unit 1325. Meanwhile, in order to control the stator 1320, when the control command 1352 of the control unit 1350 is transmitted to the stator switching unit 1325 through the control circuit 1351, power generated from the stator 1320 (not shown) is supplied to the power supply/grid 1370 via the stator switching unit 1325.

In addition, when the control command 1352 of the control unit 1350 is transmitted to the rotor switching unit 1345 via the control circuit 1351 in order to drive the rotor 1340, a second rotating magnetic field (not shown) is generated by supplying second power from the power supply/grid 1370 to the multi-phase coils (not shown) of the rotor 1340 via the rotor switching unit 1345. Meanwhile, in order to control the rotor 1340, when the control command 1352 of the control unit 1350 is transmitted to the rotor switching unit 1345 through the control circuit 1351, the power generated from the rotor 1340 (not shown) is supplied to the power supply/grid 1370 via the rotor switching unit 1345.

Meanwhile, the second rotating magnetic field measures the size, frequency, and the like of the first rotating magnetic field through the sensor 1380 included in the stator 1320 and transmits the measured value 1353 to the control circuit 1351, and the stator 1320 and the rotor 1340 are actively controlled to optimize the torque and efficiency of the electromagnetic machine by comparing the magnitude, frequency, and the like of the second rotating magnetic field. In addition, the first rotating magnetic field also measures the size, frequency, and the like of the second rotating magnetic field through the sensor 1380 included in the rotor 1340 and transmits the measured value 1354 to the control circuit 1351 and actively controls the stator 1320 and the rotor 1340 by comparing with the size, frequency, and the like of the first rotating magnetic field in order to optimize the torque and efficiency of the electromagnetic machine.

Meanwhile, the sensor 1380 measures at least one or more dynamic operating states (torque, current, voltage, position, speed, and the like) of the stator 1320 and the rotor 1340 to be used to optimize the use of the electromagnetic machine. In addition, the electromagnetic machine can be operated efficiently and safely through the state information of the power supply/grid 1370 as well as the dynamic operating state measurement value obtained through the sensor 1380.

Figure 5:
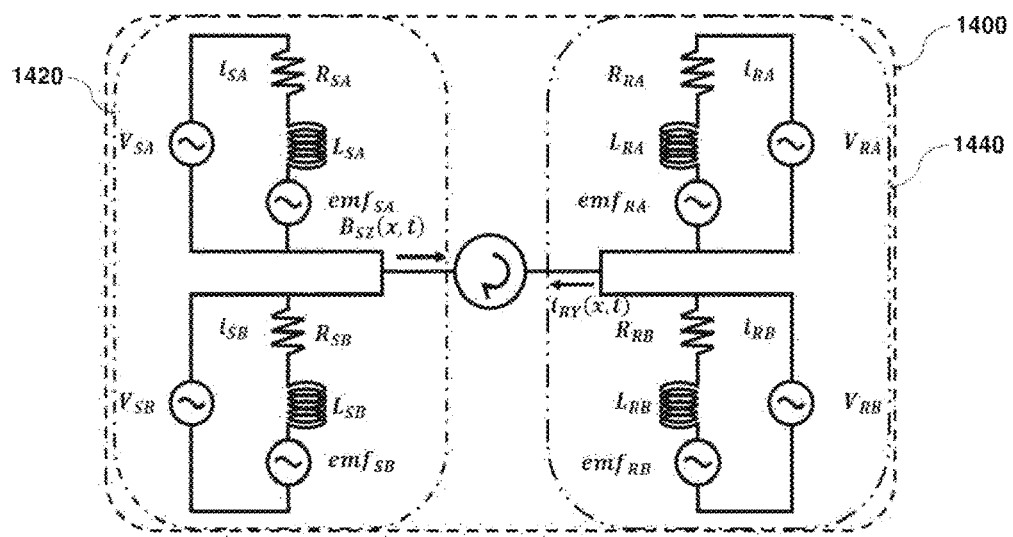
FIG. 5 is a circuit diagram illustrating an equivalent circuit for an electromagnetic machine according to an embodiment of the present invention.

FIG. 5 is a circuit diagram illustrating an equivalent circuit for an electromagnetic machine including an independently and actively controllable wound-type rotor and stator according to an embodiment of the present invention.

As illustrated in FIG. 5, an equivalent circuit 1400 of an electromagnetic machine including an independently and actively controllable wound-type rotor and a stator according to an embodiment of the present invention includes an equivalent circuit 1420 of a stator and an equivalent circuit 1440 of a rotor circuit 1440. At this time, the electromagnetic machine according to an embodiment of the present invention has been described for exemplary description as two-phase coils having a phase difference of 90°, but is not limited thereto, and it also can easily be applied to the case of multi-phase coil by those skilled in the art. The force according to Lorenz's law can be expressed by the following equation.

$$F = lB_S i_r \quad \text{(Equation 1)}$$

In here, F is the force generated in the wire, l is the length of the rod-shaped wire, $B_S$ is the size of the magnetic field generated by the current flowing in the stator coil, and $i_r$ is the current flowing in the mover wire.

In the electromagnetic machine equivalent circuit 1400 according to an embodiment of the present invention, it can be expressed as the following equations by assuming that the rotating magnetic field generated in the stator equivalent circuit 1420 is generated in the Z-axis direction, and the current supplied from the equivalent circuit 1440 of the rotor is supplied in the Y-axis direction. In particular, the magnetic flux generated by the current flowing in the coil A of the stator can be approximated as a sine wave, and can be expressed by the following equation.

$$B_Z^{(A)}(x) = B_0 \cos(k_S x_S) \quad \text{(Equation 2)}$$

The stator coil can have several periods of an electromagnetic machine. In Equation 2, the superscript A means coil (phase) A. Also, magnetic flux is generated in the phase A coil of the stator. In addition, the phase B coil is electrically out of phase by 90° with respect to the phase A coil, and the magnetic flux generated by the current flowing in the phase B coil can be expressed by the following equation.

$$B_Z^{(B)}(x) = B_0 \cos\left(k_S\left(x - \frac{\lambda_S}{4}\right)\right) = B_0 \sin(k_S \lambda_S) \quad \text{(Equation 3)}$$

Therefore, the phase A coil and the phase B coil are overlapped by the current that changes with time difference flowing through the stator coil, and a moving magnetic field is formed as shown below. This can be expressed by the following equation.

$$B_Z(x,t) = B_Z^{(A)}(x)\cos(2\pi f_S t) + B_Z^{(B)}(x)\sin(2\pi f_S t)$$

or $$B_Z(x,t) = B_0 \cos(k_S x_S)\cos(\omega_S t) + B_0 \sin(k_S x_S)\sin(\omega_S t) = B_0 \cos(k_S x_S - \omega_S t) \quad \text{(Equation 4)}$$

Similar to the rotating magnetic field produced by the current flowing in the stator coils, the current flowing in the rotor coils can be approximated as a sinusoidal wave. The current flowing in the phase A coil of the rotor can be expressed by the following equation.

$$i_Y^A = i_0 \cos(k_m x_m) \quad \text{(Equation 5)}$$

And the phase B coil has a phase difference of 90° with respect to the phase A coil, and the current flowing in the phase B coil of the rotor can be expressed by the following equation.

$$i_Y^B = i_0 \sin(k_m x_m) \quad \text{(Equation 6)}$$

Therefore, the current flowing in the rotor coil can be expressed as the superposition of the phase A coil and the phase B coil as shown below. This can be expressed by the following equation.

$$i_Y(x,t) = i_Y^A \cos(2\pi f_m t) + i_Y^B \sin(2\pi f_m t) = i_0 \cos(k_m x_m)\cos(\omega_m t) + i_0 \sin(k_m x_m)\sin(\omega_m t)$$

or $$i_Y(x,t) = i_0 \cos(k_m x_m - \omega_m t) \quad \text{(Equation 7)}$$

The Lorentz force generated by the electromagnetic machine can be expressed by the following equation from Equations 4 and 7. Here, the Lorentz force is analyzed as the interaction between the magnetic field generated from the stator and the current generated from the rotor, but this is only an example and can also be interpreted with the reverse case.

$$F(x,t) = lB_0 i_0 \cos[k_S x_S - \omega_S t] \cos[k_m x_m - \omega_m t - \varphi] \quad \text{(Equation 8)}$$

In here $\varphi$ is the phase difference between the rotor and the stator. In addition, assuming that $x_m$ is moving at a speed $v_m$ compared with $x_S$ (with respect to the stator coil), it can be expressed by the following equation.

$$x_m = x_S - v_m t \quad \text{(Equation 9)}$$

The torque interpreted by the equivalent circuit 1400 of the electromagnetic machine is proportional to the magnetic field that can be interpreted from the equivalent circuit 1420 of the stator and the equivalent circuit 1440 of the rotor, and can be expressed by the following equation. Here, the torque is interpreted as a magnetic field generated from the stator and the rotor, but this is only an example and can also be interpreted as a current generated from the stator and the rotor.

$$\tau = kB_S B_m \qquad \text{(Equation 10)}$$

At this time, the magnetic field analyzed in the equivalent circuit 1440 of the rotor according to the Biot-Savart law is proportional to the current flowing through the rotor coil. Therefore, from Equation 9, the torque is respectively proportional to the current flowing in the independently and actively controllable stator and rotor. Meanwhile, in the case of a general motor, the current flowing in the rotor is induced or derived from the stator, so to control it, the stator must be controlled. Therefore, the electromagnetic machine according to the present invention can be driven by a combination of independent currents of the stator and the rotor, so that the possible torque range when operating the electromagnetic machine is wide, the response time can be reduced, and the efficiency can be optimized. In addition, it is easy to secure safety when operating the electromagnetic machine according to an embodiment of the present invention.

Figure 6:
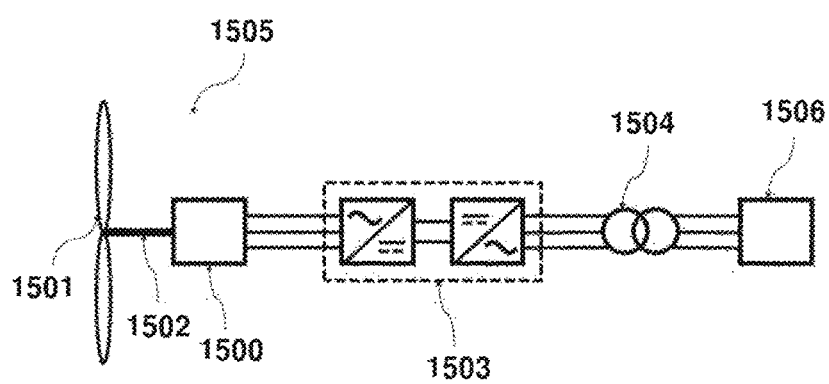
FIG. 6 is an exemplary cross-sectional view schematically illustrating a wind power generation double excitation electromagnetic machine (doubly active electromagnetic machine) to which an electromagnetic machine according to an embodiment of the present invention is applied.

FIG. 6 is an exemplary cross-sectional view schematically illustrating a new concept wind power generation double excitation electromagnetic machine (doubly active electromagnetic machine) that includes an electromagnetic machine according to an embodiment of the present invention. In FIG. 6, only an example of wind power generation is described, but the application example is not limited thereto, and it can be applied to a new and renewable energy system such as tidal power generation or wave power generation that may include an electromagnetic machine according to an embodiment of the present invention.

Referring to FIG. 6, since the double excitation electromagnetic machine 1505 for wind power generation including an electromagnetic machine according to an embodiment of the present invention can electronically implement a continuously variable gear ratio without a gearbox so it is a power generation or regenerative braking device that can generate a large driving torque. A rotary blade 1501 is connected to the electromagnetic machine 1500 through a power shaft 1502. The output of the electromagnetic machine 1500 is transmitted to a load 1506 via the power converter 1503 and the grid 1504.

Accordingly, in the dual excitation electromagnetic machine system including the electromagnetic machine according to an embodiment of the present invention, there is an advantage in that the size can be reduced and the efficiency can be increased by efficiently controlling the driving torque and speed without a gearbox. In addition, since there is no physical gear, it is possible to quickly respond to a failure.

Figure 7:
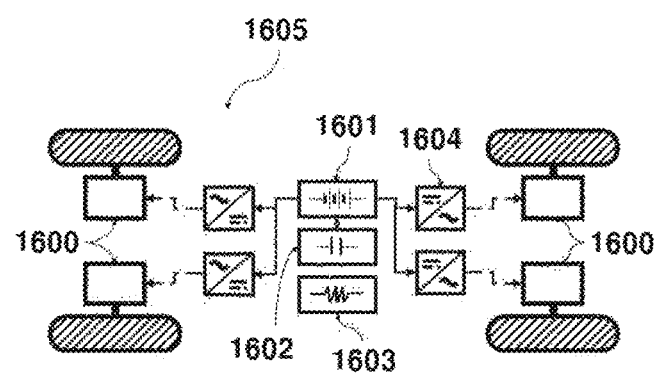
FIG. 7 is an exemplary cross-sectional view schematically illustrating an in-wheel driven electromagnetic machine to which an electromagnetic machine according to an embodiment of the present invention is applied.
Figure 8:
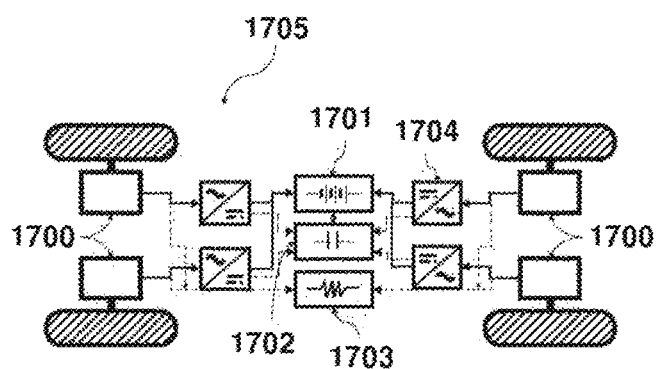
FIG. 8 is another exemplary cross-sectional view schematically illustrating a wheel-driven electromagnetic machine to which an electromagnetic machine according to an embodiment of the present invention is applied.

FIG. 7 and FIG. 8 is an exemplary schematic diagram illustrating a vehicle including an in-wheel driving motor to which an electromagnetic machine according to an embodiment of the present invention is applied. In FIG. 7 and FIG. 8, only an example of the in-wheel drive motor is described, but the application example is not limited thereto. Meanwhile, FIG. 7 is an exemplary configuration diagram related to driving a vehicle including the electromagnetic machine of the present invention, FIG. 8 is an exemplary configuration diagram related to braking of a vehicle including the electromagnetic machine of the present invention.

Referring to FIG. 7, the energy source, for example, DC power of the battery 1601 is converted into AC power through the inverter 1604. When the converted power is applied to the electromagnetic machine 1600 according to an embodiment of the present invention, a driving force is generated, and is transmitted to each wheel through a power shaft (not shown) to drive the vehicle.

Referring to FIG. 8, the inertial force of the driving vehicle is transmitted to the electromagnetic machine 1700 according to an embodiment of the present invention through the power shaft during braking, thereby entering a regenerative braking state. At this time, the generated power is charged to an energy source, for example, a battery 1701 or a capacitor 1702 through an inverter 1704, or is consumed as heat in a braking resistor 1703.

Therefore, according to the in-wheel motor including the electromagnetic machine according to an embodiment of the present invention, the size of the motor is minimized and mounted on each wheel, and the driving torque and speed of each wheel are independently and efficiently controlled, thereby ensuring vehicle stability and improving driving performance. In particular, since there is no physical gear and the rotor is independently controlled, the reaction time is short, enabling quick response according to the driving situation.

Figure 9:
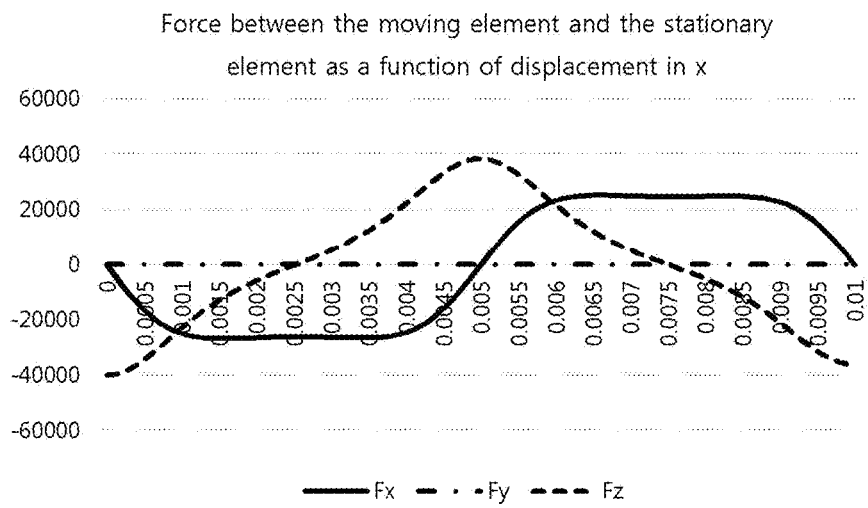
FIG. 9 shows the force between the stator and the mover according to an embodiment of the present invention.

FIG. 9 represents the force between the stator and the mover (rotor) according to the embodiment of the present invention. The mover can move freely in the x direction. In a rotating electromagnetic machine, x is the direction of axis rotation. The mover does not move in either the y or z direction, and the force in the z direction refers to the direction of the pulling or pressing force between the mover and the stator.

When the multi-phase coil of the stator is driven by DC current, an AC magnetic field is generated in the air gap, and when the multi-phase coil of the mover is driven by DC current, an AC magnetic field is generated in the air gap. It has a magnetic field spatial period of 0.01 m in the x direction. Magnetic field locking of the current of the multi-phase coil is accomplished in the y direction, and the magnetic field of the air gap changes periodically in the x direction.

The figure can be expressed as the restoring force, the force in the x direction to return to the stable equilibrium position, (−0.5*period<x<0.5*period), and the repulsive force, the force to push the mover to the stable position. The point at x=0.5*period (0.5*period<x<1.0*period) is the saddle point. Force and displacement serve as a periodic function of the mover offset angle. A restoring force exists where the mover and the stator face opposite polarities from each other, and when this condition is met, the mover and the stator are defined as being in "magnetic field locking (field locking)". Magnetic field locking can be maintained with the stator, and the mover creates a separate rotating magnetic field while the mover rotates.

Magnetic field locking (field locking) has an air gap with a certain distance between the stator having a multi-phase coil capable of generating a moving magnetic field and a mover having a multi-phase coil capable of independently generating a moving magnetic field independently, and the mover can be formed in an electromagnetic machine that can move at regular distances in the direction normal to the flow of current. The moving magnetic field is focused and generated in the air gap, and the vector direction of the magnetic field, the direction of current flow, and the moving direction of the moving object have an orthogonal relationship with one another.

The magnetic field generated by the current flowing in each multi-phase coil of the stator and the mover maintains a stable state in which the magnetic field polarities are opposite to each other, which is a magnetic field locking phenomenon. When the mover moves out of this stable state by an external force, a restoring force tending to return to the original state is generated. If the moving distance is small, the restoring force is proportional to the moving distance, and the direction of the force is in the opposite direction to the moving direction.

Before the electromagnetic machine starts to operate, magnetic field locking is first formed, and during operation, the in-rush current is maintained to be below an appropriate level at the start of operation, and operation is started. By always maintaining magnetic field locking during operation, it is possible to quickly respond to the torque required for a wide dynamic operating range, and it is possible to secure safety with the bi-directional power transfer function.

The rotor position can be stable when the mover and the stator face with opposite polarities. When the mover and the stator are displaced to face each other with the same pole, the repulsive force pushes the mover toward a stable region. Restoring forces exist when opposite poles are faced, whereas repulsive forces occur when similar poles are faced.

In motor operation, an external load on the shaft, e.g. friction, is dragging with f_ext (f_ext<0), and the mover position can be moved away from stable equilibrium (x<0, fx>0). It means that the motor performs the task of converting electrical energy into mechanical energy.

In generator operation, the external load is pushing the mover with f_ext>0 in the x direction, and the external force can be balanced by the restoring force fx<0. In this case, it means that the generator converts mechanical work into electrical energy.

The stator and mover of an electromagnetic machine according to an embodiment of the present invention may be formed in a coil arrangement. For example, it can be formed with a coil arrangement such as FIG. 10. Hereinafter, the arrangement of the coils constituting the stator and the mover will be described in detail.

The stator includes a first coil arrangement; the mover includes a second coil arrangement formed to be spaced apart from the first coil arrangement at a predetermined distance, and having a mirror image in a spaced apart direction; the first coil arrangement includes at least one first half period and at least one second half period formed adjacent to each other; and the first half period includes at least two coils having different current flowing directions, wherein the first half period and the second half period may have mirror images in adjacent directions.

Figure 10:
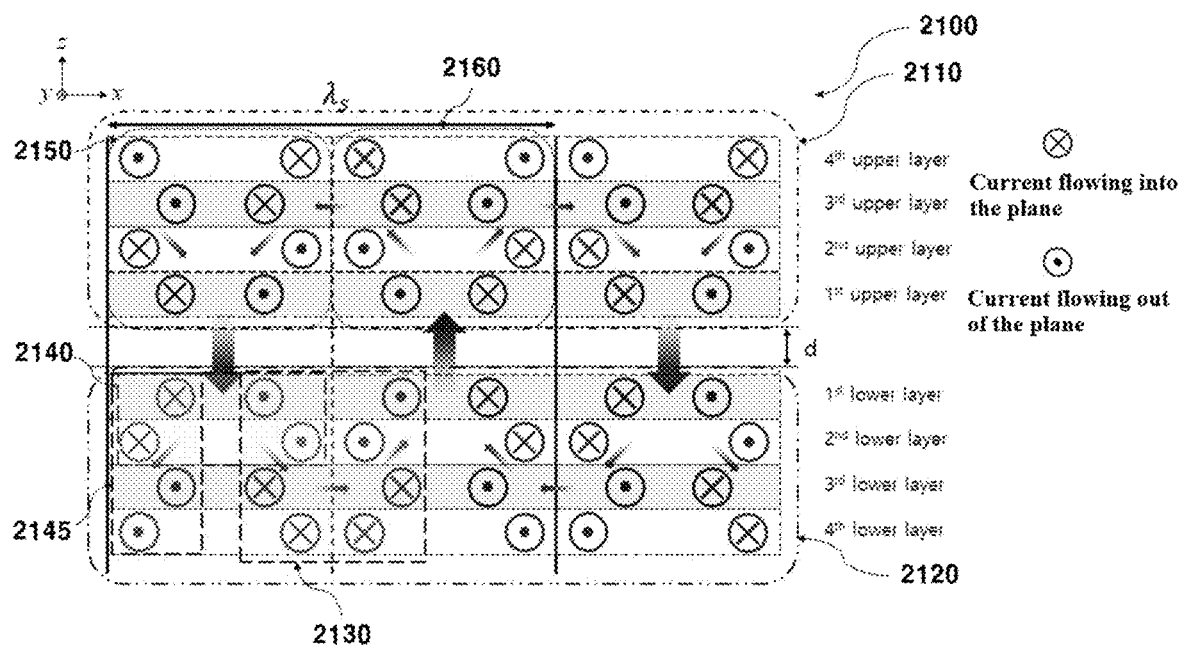
FIG. 10 is an exemplary cross-sectional view schematically illustrating a current flow and magnetic flux according to a coil arrangement of a stator and a mover according to an embodiment of the present invention.

FIG. 10 is an exemplary cross-sectional view schematically illustrating a current flow and magnetic flux size according to a coil arrangement of a stator and a mover according to an embodiment of the present invention. As illustrated in FIG. 10, a coil arrangement 2100 according to an embodiment of the present invention includes a first coil arrangement 2110 and a second coil arrangement 2120. Hereinafter, the coil arrangement means the coil arrangement of the stator and the mover.

The first coil arrangement 2110 and the second coil arrangement 2120 are formed to be spaced apart by a predetermined distance, and have a mirror image in the spaced apart direction. That is, the first coil arrangement 2110 and the second coil arrangement 2120 have mirror images with the x-axis as the axis of symmetry. In here, the mirror image has a structure corresponding to each other about the axis of symmetry, and means that it has the same structure as reflected in a mirror.

In this case, the first coil arrangement 2110 includes at least one first half period and at least one second half period formed adjacent to each other. The first half period 2150 and the second half period 2160 are formed as one period, and may be formed in a periodic form in which the same structure is repeated every spatial period $\lambda_S$. The first half period 2150 includes at least two coils having different current flowing directions, and the first half period and the second half period have mirror images in adjacent directions. That is, the first half period 2150 has a mirror image of the second half period 2160 with the z-axis as an axis of symmetry.

Referring to FIG. 1, a first coil arrangement 2110 and a second coil arrangement 2120 are spaced apart from each other by a predetermined distance in the z-axis direction, that is, an air gap d. The distance between the first coil arrangement 2110 and the second coil arrangement 2120 may be set by magnetic flux or other components to be implemented using the coil arrangement, and may be set by a user.

The first half period 2150 includes at least two coils in which current flows are different from each other. FIG. 10 illustrates an embodiment in which the first half period 2150 is formed of a plurality of layers, but this is only one example, and the first half period 2150 may include at least two pieces of coils in which current flows are different from each other. The two coils may have opposite current flow directions. In one coil, a current flows in +y direction, a direction flowing into the plane of FIG. 10, and in the other coil, a current may flow in −y direction, a direction flowing out of the plane of FIG. 10. When a current flows in a coil in one direction, a magnetic field is created in the coil. When a current flows into the plane of FIG. 10, a magnetic field is formed surrounding the coil in a clockwise direction, and when a current flows out of the plane of FIG. 10, a magnetic field is formed in a counterclockwise direction surrounding the coil. In here, the two coils included in the first half period 2150 may be coils included in the first upper layer on the first half period 2150 of FIG. 10. The magnetic field between the two coils is formed in the direction of the second coil arrangement 2120 to strengthen the magnetic flux due to the counterclockwise magnetic field generated by the coil located on the right side and through which current flows out of the plane and the clockwise magnetic field generated by the coil located on the left side and through which current flows into the plane.

In the second half period 2160 having a mirror image of the first half period 2150, unlike the first half period, a coil through which current flows into the plane is formed on the right side, and a coil through which current flows out of the plane is formed on the left side. Since the coil of the second half period 2160 is formed to have an opposite current flow direction than that of the coil of the first half period 2150, the magnetic field between the two coils is formed in the opposite direction of the second coil arrangement 2120 to strengthen the magnetic flux.

The first coil arrangement 2110 and the second coil arrangement 2120 may be formed in a plurality of layers. It may be formed of a plurality of layers of two or more layers. Although illustrated as four layers by way of example in FIG. 10, the present invention is not limited thereto, and the number of layers may be small or additional layers may be further included as needed.

The first coil arrangement 2110 and the second coil arrangement 2120 may be formed in three layers.

The first layer of the first half period 2150 may include at least two coils through which current flows in different directions. For example, the left side coil of the first layer is a coil indicating a current flowing into the plane, and the right side coil is a coil indicating a current flowing out of the plane. The second layer of the first half period 2150 has the same current direction as the coil current of the first layer, but is disposed relatively outer side than the coil of the first layer.

In addition, the third layer of the first half period 2150 is opposite to the coil current direction of the second layer. That is, the left side coil of the third layer is a coil indicating the current flowing out of the plane, and the right side coil is the coil indicating the current flowing into the plane. Meanwhile, the coil of the third layer is disposed relatively inward than the coil of the second layer. The fourth layer of the first half period 2150 has the same current direction as the coil current of the third layer, but is disposed relatively outer side than the coil of the third layer.

Alternatively, the first coil arrangement 2110 and the second coil arrangement 2120 may be formed as a lower layer and an upper layer. In here, the lower layer may correspond to the first layer of FIG. 10, and the upper layer may correspond to the third layer of FIG. 10. It may include only the first layer and the third layer, and may not include the second layer and the fourth layer.

Meanwhile, the current directions of the first half period 150 and the second half period 160 illustrated in FIG. 10 are exemplarily shown for explanation, and are not limited thereto, and relationship and the direction of the current in the coil can change with time. In addition, the relative positions of coils or the number of coils in each layer illustrated in FIG. 10 are illustratively shown for explanation, and the position or number of coils is not limited thereto and can be changed within the scope that does not violate the spirit of the present invention.

The first coil arrangement 2110 may be formed in a coil structure having the above-described current distribution. Here, the first coil arrangement 2110 and the second coil arrangement 2120 are exemplarily illustrated as a stacked coil structure 2130, a horizontally stacked coil structure 2140 and a vertically stacked coil structure 2145, but is not limited thereto, and if necessary, a planar structure having the current distribution illustrated in FIG. 10 may be substituted for the three-dimensional stacked structure.

The coil arrangement 2100 according to an embodiment of the present invention has a structure in which magnetic flux is strengthened in one direction and magnetic flux is canceled in the other direction. That is, referring to FIG. 10, in the first coil arrangement 2110 and the second coil arrangement 2120, the magnetic flux is strengthened to one side facing each other in the z-axis direction, and the magnetic flux is relatively cancelled or appears to be almost negligible to exist in the other directions. Accordingly, the coil arrangement 2100 according to the present invention has the effect of minimizing the magnetic field leakage outside the region of interest.

Figure 11:
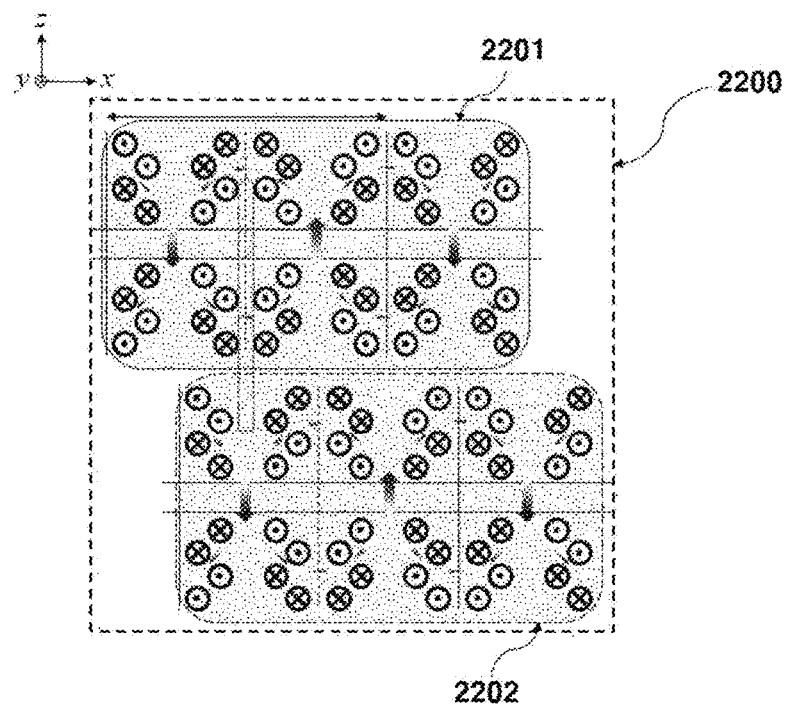
FIG. 11 is a schematic exemplary cross-sectional view illustrating an arrangement of coils of a stator and a mover as a set of two phase coils according to an embodiment of the present invention.

FIG. 11 is a schematic cross-sectional view illustrating a coil arrangement according to an embodiment of the present invention as two phase difference coil sets.

Referring to FIG. 11, a coil arrangement 2200 according to an embodiment of the present invention includes a coil arrangement set 2201 for phase A and a coil arrangement set 2202 for phase B having a phase difference of 90 degrees from each other. The two coil arrangement sets may have different phases or may have the same phase with each other. The coil arrangement 2200 disposes a set of coil arrangements 2202 for phase B between a set of coil arrangements 2201 for phase A allowing the sets to be disposed alternately.

Accordingly, it is possible to form a moving magnetic field (not shown) by sequentially supplying currents with phase differences that change with time to the coil arrangement set 2201 for phase A and the coil arrangement set 2202 for phase B. Using such a moving electromagnetic field, it is possible to achieve the same effect as a stator of an electromagnetic machine. Meanwhile, although the phases of the coil arrangement 2200 are illustrated as two phases in FIG. 11, but is not limited thereto, and a coil arrangement of three or more phases is also possible by adding sets as necessary and sequentially overlapping them alternately.

Figure 12:
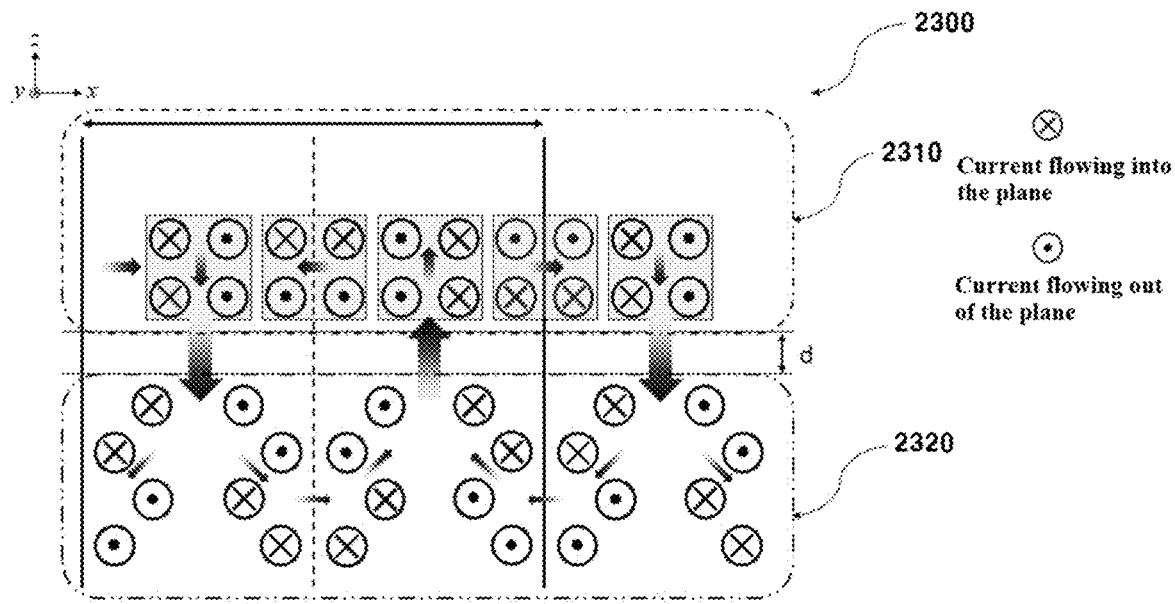
FIG. 12 is an exemplary cross-sectional view schematically illustrating a current flow and a magnetic flux size according to a coil arrangement of a stator and a mover according to an embodiment of the present invention.

FIG. 12 is an exemplary cross-sectional view schematically illustrating current flow and magnetic flux magnitude according to a coil arrangement according to an embodiment of the present invention.

As illustrated in FIG. 12, the coil arrangement 2300 according to the embodiment of the present invention includes a first coil arrangement 2310 and a second coil arrangement 2320. In this case, the second coil arrangement 2320 is the same as the coil arrangement illustrated in FIG. 10 and described above, but the first coil arrangement 2310 can be arranged as a Halbach Arrangement which is illustrated in FIG. 12 and is a special structure of the above-described coil arrangements. In addition, in the coil arrangement 2300, magnetic flux is strengthened between the first coil arrangement 2310 and the second coil arrangement 2320, and the magnetic flux may be relatively small to a negligible extent or cancelled. Meanwhile, although the first coil arrangement 2310 is illustrated as a Halbach Arrangement in FIG. 12, but is not limited thereto, and the second coil arrangement 2320 may be used as a Halbach Arrangement, or both of the first coil arrangement 2310 and the second coil arrangement 2320 may be used as a Halbach Arrangement as necessary.

Figure 13:
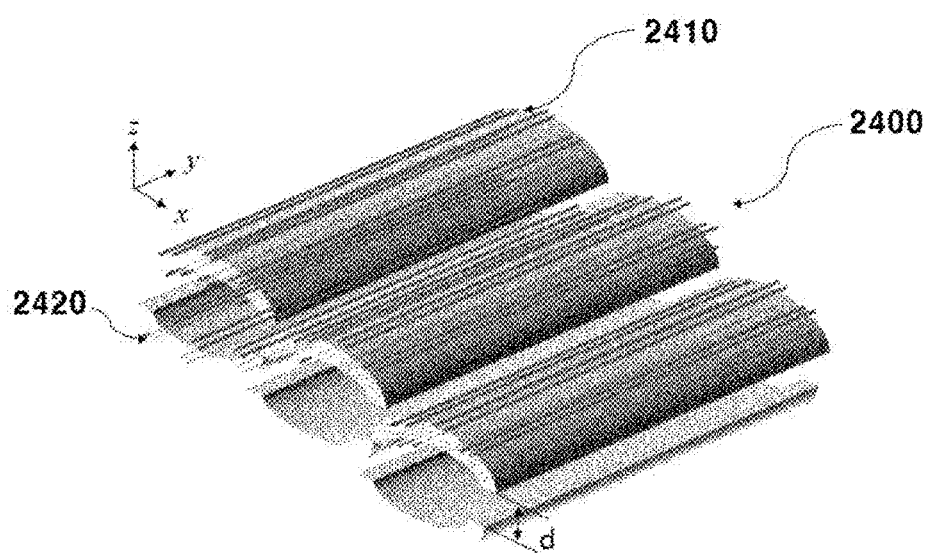
FIG. 13 is an exemplary schematic perspective view of a coil arrangement structure of a stator and a mover according to an embodiment of the present invention.

FIG. 13 is an exemplary schematic perspective view of a coil arrangement structure according to an embodiment of the present invention.

As illustrated in FIG. 13, in the coil arrangement 2400 according to the embodiment of the present invention, the first coil arrangement 2410 and the second coil arrangement 2420 repeat the same structure at every spatial period along the x-axis direction. In addition, the first coil arrangement 410 and the second coil arrangement 420 are extended in length in the direction in which the current flows (that is, y-axis direction) in the periodic structure, and has a segmented toroid or segmented solenoid current distribution.

In addition, the moving field electromagnetic machine (not shown) including the coil arrangement 400 according to an embodiment of the present invention may be implemented with an iron core free structure or a minimum iron core. Therefore, it is expected that efficiency can be maximized by using the minimum iron core in the electromagnetic machine, weight and size can be minimized, and core loss due to the use of the iron core can be reduced.

In addition, the magnetic field generated by the coil arrangement according to the embodiment of the present invention is periodically changed in one direction. All these properties are possible only with the coil arrangement according to the embodiment of the present invention without using an iron core. In particular, the magnetic field $B_Z^{(A)}(x)$ generated by the coil arrangement according to the embodiment of the present invention can be approximated as a sine wave as follows.

$$B_Z^{(A)}(x) = B_0 \cos \frac{2\pi x}{\lambda_S} \qquad \text{(Equation 11)}$$

In here, $\lambda_S$ is the spatial period of the magnetic field. In the case of a moving field electromagnetic machine, $\lambda_S$ is the spatial period of the stationary coil (unit m), and the spatial period of the mover coil can be expressed as $\lambda_m$. It is one of the coil design elements of the stator of an electromagnetic machine. A stator coil can contain several periods of an electromagnetic machine. That is, the superscript (A) denotes coil (phase) A. The magnetic flux density is mostly strengthened in the z-axis direction.

Meanwhile, it is assumed that the other directional components of the magnetic flux density are negligible, and especially in the space between complementary coil arrangements, such as the coil arrangement of the embodiment of the present invention, the other directional components are negligible. The magnetic field of the stator can be expressed by the following equation which is proportional to the stator current.

$$B_0 = k_S I_S \quad \text{(Equation 12)}$$

In addition, for coil (phase) B, a coil arrangement according to an embodiment of the present invention may produce different magnetic fluxes. Coil (phase) B is physically moved $\lambda_S/4$ more than coil (phase) A, and the magnetic field $B_Z^{(B)}(x)$ of coil B can be expressed as the following equation.

$$B_Z^{(B)}(x) = B_0 \sin\frac{2\pi x}{\lambda_S} \lambda_S = B_0 \cos\left(k_S\left(x + \frac{\lambda_S}{4}\right)\right) \quad \text{(Equation 13)}$$

In here, kS is the propagation vector of the first coil arrangement (stator), and $kS=2\pi/\lambda S$. The propagation vector of the second coil arrangement (mover) may be expressed as $km=2\pi/\lambda m$.

The analysis of the coil arrangement according to the embodiment of the present invention is exemplarily performed using a two-phase coil structure. Even assuming such a two-phase coil structure, the concept is the same, and the generality is not impaired. This analysis can be extended to a polyphase coil structure like a three-phase coil structure, and the analysis results and conclusions can be equally applied to a polyphase system. If necessary, differences between two-phase systems and three-phase systems can be mentioned. Meanwhile, in the case of a three-phase system, three sets of coils, generally called U, V and W coils, are required. V and W coils are shifted in spatial phase by $\lambda S/3$ and $2\lambda S/3$ compared to U coils.

In the coil arrangement according to the embodiment of the present invention, the magnetic field generated by the complementary first coil arrangement and the second coil arrangement has the following characteristics:

The magnetic field between the first coil arrangement and the second coil arrangement is strengthened in one side of the z-axis directions (i.e., between the coil arrangements). Except on one side where the magnetic field is strengthened, it is almost cancelled out in the other side (i.e., outside the coil arrangement).

Meanwhile, magnetic fields generated in coil (phase) A and coil (phase) B of the coil arrangement according to the embodiment of the present invention are independently generated and overlapped. In addition, coil A and coil B are electrically driven with a phase difference of 90 degrees to generate a moving magnetic field. The overlappingly modulated magnetic field $B_Z(x)$ by coil A and coil B can be expressed as the following equation.

$$B_Z(x) = B_Z^{(A)}(x)\cos(2\pi f_S t) + B_Z^{(B)}(x)\sin(2\pi f_S t) \quad \text{(Equation 14)}$$

Meanwhile, referring to Equations 1 and 3, Equation 4 can be expressed as the following Equation.

$$B_Z(x) = B_0(k_S x)\cos(\omega_S t) + B_0(k_S x)\sin(\omega_S t) = B_0 \cos(k_S x - \omega_S t) \quad \text{(Equation 15)}$$

In here, $\omega_S$ is the period of the first coil arrangement current, and the relation with the frequency fs of the first coil arrangement current is $\omega_S = 2\pi f_S$.

The above magnetic flux density is in the form of a moving magnetic field in which the waveform pattern moves in the positive x-axis direction with the next velocity vS.

$$v_S = \frac{\omega_S}{k_S} \quad \text{(Equation 16)}$$

The direction of the wave pattern moving in the negative x-axis direction can be changed by changing the sign of the current in the coil pair or by time modulation.

An electromagnetic machine can be manufactured by providing a mover according to a coil in which current can flow perpendicular to a magnetic field generated by supplying current through a stator coil including a coil arrangement according to an embodiment of the present invention.

A moving field electromagnetic machine can be configured using the above coil arrangement. A moving electromagnetic machine according to an embodiment of the present invention includes a stator and a mover, wherein the stator comprises a first coil arrangement; the first coil arrangement includes at least one first half period and at least one second half period formed adjacent to each other, wherein the first half period includes at least two coils having different current flowing directions; and the first half period and the second half period may have mirror images in adjacent directions. A detailed description of the coil arrangement included in the moving field electromagnetic machine according to an embodiment of the present invention corresponds to the detailed description of the coil arrangement according to the embodiment of the present invention described above, and thus, redundant description will be omitted.

Alternatively, the stator may further include a second coil arrangement formed to be spaced apart from the first coil arrangement by a predetermined distance and having a mirror image in a spaced apart direction, wherein the mover may be formed between the first coil arrangement and the second coil arrangement.

Alternatively, the mover may include a second coil arrangement formed to be spaced apart from the first coil arrangement by a predetermined distance and having a mirror image in the spaced apart direction. That is, the first coil arrangement and the second coil arrangement of the coil arrangement according to the embodiment of the present invention may be a stator or a mover, respectively.

In addition, the mover may be a rotor.

y-axis direction is assumed, and assume that the mover is allowed to move in the x-axis direction. If the amount of current flowing through the wire is i, the Lorentz force $\delta F_x(x)$ can be expressed as the following equation for the length 1 of the wire (or 1 is the length of the region where the magnetic flux is constant).

$$\delta F_x(x) = lI_y(x) B_Z(x) \quad \text{(Equation 17)}$$

In here, $I_y(x)$ is the current flowing in the y direction from the position x. As a function of x, we can form a wire arrangement through which current flows. In particular, the current distributed on the mover has the same (spatial) period as the stator.

$$I_y(x_m) = I_0 \cos\left\{\frac{2\pi x}{\lambda_S} - \omega_S t - \phi\right\} \quad \text{(Equation 18)}$$

In here, xm is the x-direction coordinates of the second coil arrangement (mover), and the x-direction coordinate of the first coil arrangement (stator) may be expressed as xS.

Thus, it means that a current on the mover can be generated to cause this current to move relative to the mover (or possibly a rotor). In principle, a sinusoidal distribution of current can be realized by stacking very small wire loops together, and the number of wires per unit length can be expressed as the following equation.

$$n(x_m) = n_0 \cos\left\{\frac{2\pi x_m}{\lambda_S}\right\} \quad \text{(Equation 19)}$$

If a small current i flows through the wire, it can be expressed by the following equation.

$$I_0 = n_0 i \quad \text{(Equation 20)}$$

To implement sinusoidal current density distribution may not be easy to implement $$I_y^A(x_m) = I_0 \sum_k \left\{ h(x_m - k\lambda_S) - h\left(x_m - k\lambda_S - \frac{\lambda_S}{2}\right) \right\} \quad \text{(Equation 21)}$$

If $$0 < x_m < \frac{\lambda_S}{4},$$

$h(x_m) = 1$, and if $$x_m > \frac{\lambda_S}{4},$$

$h(x_m) = 0$.

In here, $h(x_m)$ is a periodic function with period $\lambda_S$. For example, $\phi$ is any initial phase value of the mover.

Figure 14:
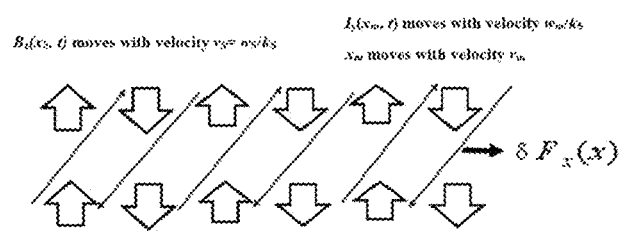
FIG. 14 is a schematic conceptual diagram illustrating an interaction between a magnetic field and a current generated by a coil arrangement structure of a stator and a mover according to an embodiment of the present invention.

FIG. 14 is a conceptual diagram schematically illustrating an interaction between a magnetic field and a current generated by a coil arrangement structure according to an embodiment of the present invention.

Referring to FIG. 14, the Lorentz force generated in the electric wire through which the current flows by the interaction between the magnetic field and the current generated by the coil arrangement according to the embodiment of the present invention may be expressed as the following equation in the x-axis direction. On the other hand, the force generated in the stator is the same in each half period along the x-axis direction, but is generated in the opposite direction.

$$\delta F_x(x) = lB_S I_m \cos\{k_S x_S - \omega_S t\} \cos\{k_S(x_S - v_m t) - \omega_m t - \phi\} \quad \text{(Equation 22)}$$

It is assumed that xm is moving with velocity vm with respect to xS. The relationship is as follows.

$$x_m = x_S - v_m t \quad \text{(Equation 23)}$$

The force per period can be calculated as follows.

$$\delta F_x(x_S) = lB_S I_m \cos\{k_S x_S - \omega_S t\} \cos\{k_S(x_S - v_m t) - \omega_m t - \phi\}$$

$$\delta F_x(x_S) = lB_S I_m \cos\{k_S x_S - \omega_S t\} \cos\{k_S x_S - (\omega_m + k_S v_m)t - \phi\} \quad \text{(Equation 24)}$$

Equation 14 can be rearranged as follows.

$$\delta F_x(x_S, t) = \tfrac{1}{2} lB_S I_m [\cos\{2k_S x_S - (\omega_S + \omega_m + k_S v_m)t - \phi\} + \cos\{(\omega_S - \omega_m - k_S v_m)t - \phi\}] \quad \text{(Equation 25)}$$

The first term in Equation 15 changes rapidly in both space and time. When the force is accumulated over many spatial periods regardless of time the average value disappears. The force per spatial period $\lambda_S$ (M is large enough and integrated over M periods) can be expressed as the following equation.

$$f_x(x_S, t) = \frac{1}{M} \int_0^{M\lambda_S} \delta F_x(x_S, t) = \frac{1}{2} n_m \lambda_S lB_0 I_m \cos\{(\omega_S - \omega_m - k_S v_m)t - \phi\} \quad \text{(Equation 26)}$$

The periodic average force for any periodic current distribution can be calculated. The results appear to be the same as the harmonic components of the same Fourier series expansion are generated as a current average value of 0.

The relationship between the periods of the current driven in the mover is same as the following equation.

$$(\omega_m + k_S v_m) = \omega_S \quad \text{(Equation 27)}$$

That is, the moving magnetic field generated in the mover means that the synthesized magnetic field is synchronized with the moving magnetic field generated by the stator. Since the spatial period of the mover and the stator has the same value, the magnetic poles of the mover and the stator are attracted to opposite sides, and thus the magnetic flux paths are synchronized and field locked.

When the mover and the stator are magnetically field locked to each other, the position of the mover (rotor) is in the equilibrium position, and the average magnetic force between the mover and the stator becomes zero in the equilibrium state. $\phi$ denotes the electric field phase difference and is proportional to the position offset from equilibrium between the mover and the stator.

$$f_{x,SYNC}(x, t) = \frac{1}{M} \int_0^{M\lambda_S} \delta F_x(x, t) = \frac{1}{2} n_m \lambda_S lB_0 I_0 \cos\phi \quad \text{(Equation 28)}$$

If $\phi = 0$, the external force or torque does not change, and the magnetic flux field locking places the mover in the equilibrium position. When the mover moves in equilibrium, a magnetic force is generated and the mover moves to the equilibrium position. Conversely, when an external force or torque is applied to the mover, the magnetic force due to the pulling action of the opposite pole corresponds to the external force. At this time, the position of the mover is changed according to an external force. The magnitude of the reaction is proportional to the product of the stator current and the mover current, and the total magnetic force or torque is proportional to the number of spatial periods.

In here, if $\cos\phi$ is positive and constant, a steady state force arises on the mover from the interaction of the stator and the mover (or rotor), and the force is pushing the mover against friction. In this case, the power supplying machines of the stator and mover supplies power for slow acceleration or steady state against friction. If φ=0, the maximum force is generated.

When the moving field electromagnetic machine according to an embodiment of the present invention is used as a motor, the following condition is maintained while current is supplied.

$$\cos\{(\omega_S-\omega_m+k_S v_m)t-\phi\} \geq 0 \quad \text{(Equation 29)}$$

The condition cos φ<0 is a steady state condition when the mover (rotor) is being pushed by an external force. A negative force means that work is performed by an external force. That is, when the moving field electromagnetic machine according to an embodiment of the present invention is operating as a generator. Electric current flows through the mover coil, so power is generated.

In the case of a steady state force, the mover moves with velocity vm, and the current moves at the same velocity vS as the magnetic field produced by the stator. When the frequency of the mover and the stator is the same and there is no external force, the mover maintains a fixed position. However, if the mover and the stator are driven at different frequencies and the magnetic field moves in the same direction, the mover (rotor) axis moves in vS-vm. When the magnetic rotation (field rotation) is in the opposite direction, the mover (rotor) shaft rotation speed is the sum of the stator magnetic rotation speed and the mover (rotor) magnetic rotation speed. Through this, it is possible to enable fast rotation.

When the magnetic field in the stator moves with velocity vS, it can be expressed as the following equation.

$$v_S = \omega_S/k_S \quad \text{(Equation 30)}$$

When a steady-state force is generated in a mover, the mover (rotor) moves with a very slow acceleration or in the case when the force is balanced with an external force, at this time, it is moved at a constant velocity.

Figure 15:
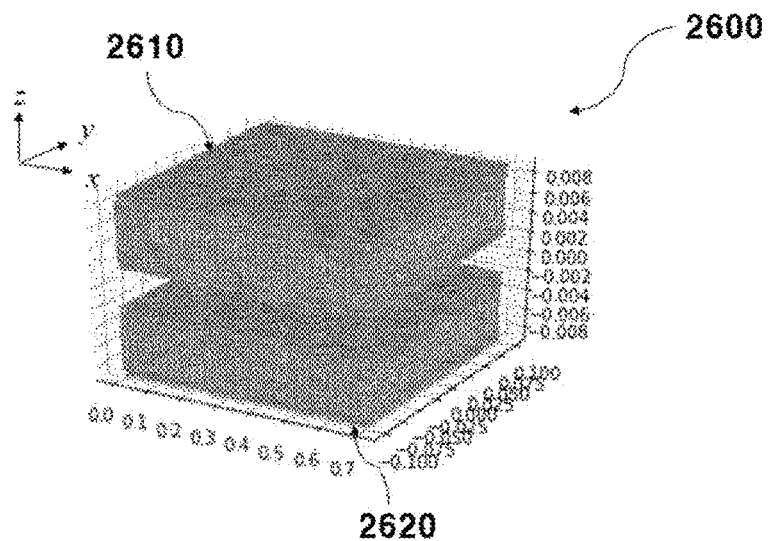
FIG. 15 is an exemplary schematic cross-sectional view illustrating a coil arrangement of a stator and a mover according to an embodiment of the present invention applied in a horizontal direction with a stacked coil.

FIG. 15 is a schematic cross-sectional view illustrating a coil arrangement according to an embodiment of the present invention applied in a horizontal direction with a stacked coil.

Referring to FIG. 15, a coil arrangement 2600 according to an embodiment of the present invention has a stacked coil and is implemented as a periodic structure in the x-axis direction. In this case, the coil arrangement 2600 is implemented as a first coil arrangement 2610 and a second coil arrangement 2620 spaced apart by a predetermined distance in the z-axis direction. In addition, the magnetic flux density is strengthened in one direction which is between the first coil arrangement 2610 and the second coil arrangement 2620, and magnetic flux densities are offset except in directions facing each other inside the first coil arrangement 2610 and the second coil arrangement 2620, and the magnetic field leakage can be minimized in the outside.

Figure 16:
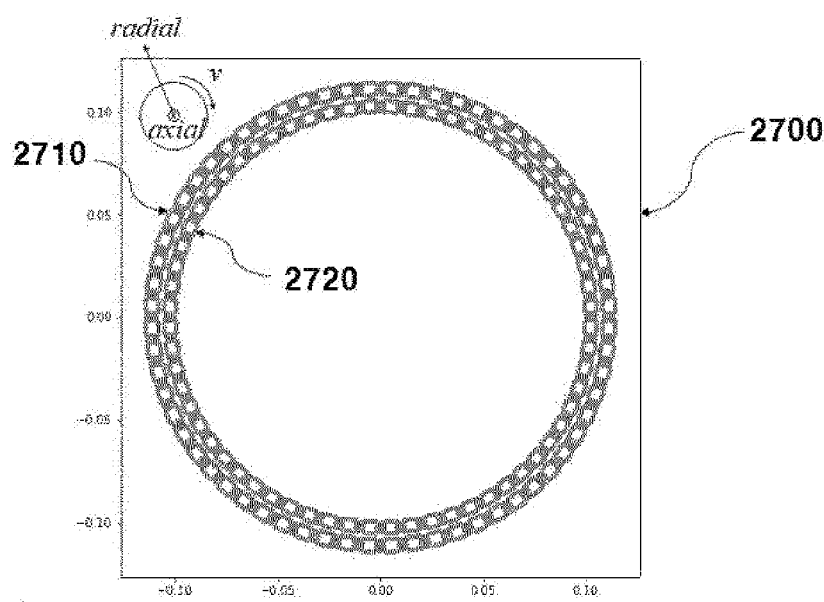
FIG. 16 is an exemplary schematic cross-sectional view illustrating the three-dimensional structure of the coil arrangement of the stator and the mover according to the embodiment of the present invention.

FIG. 16 is a schematic cross-sectional view illustrating a coil arrangement according to an embodiment of the present invention applied in a three-dimensional structure with a stacked coil.

Referring to FIG. 16, a coil arrangement 2700 according to an embodiment of the present invention is implemented in a circular shape with a stacked coil. At this time, the coil arrangement 2700 according to an embodiment of the present invention is spaced apart by a predetermined distance in a radial direction, and the first coil arrangement 2710 and the second coil arrangement 2720 repeat the same structure at every spatial period along the tangential direction. In addition, the first coil arrangement 2710 and the second coil arrangement 2720 are implemented to be complementary to each other. That is, the current distribution of the first coil arrangement 2710 can be viewed as having a mirror image of that of the second coil arrangement 2720 with respect to the tangential direction. In addition, in the first coil arrangement 2710 and the second coil arrangement 2720 arranged in form of a circle, the magnetic flux density is strengthened to one side between them in the radial direction, but the magnetic flux density to the other side in the outside of them is canceled.

Meanwhile, in here, the first coil arrangement 2710 and the second coil arrangement 2720 are arranged on the circumference and are short in size and thus are exemplarily illustrated to have almost the same size, but is not limited thereto, and the size of the coil arrangement on the inner circumference can be reduced or the size of the coil arrangement on the outer circumference can be increased within the scope that does not impair the spirit of the present invention if necessary.

Figure 17:
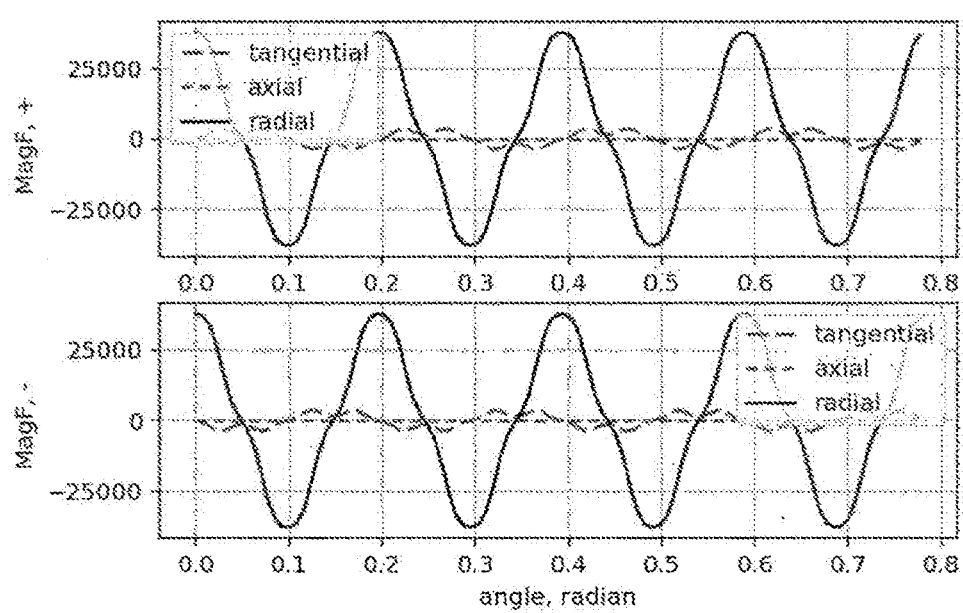
FIG. 17 is a simulation result diagram for a three-dimensional structure applied to a coil arrangement of a stator and a mover according to an embodiment of the present invention.

FIG. 17 is a simulation result diagram for a structure to which a three-dimensional structure is applied to a coil arrangement according to an embodiment of the present invention.

This simulation result diagram was calculated using the python program and based on the Biot-Savart law. Referring to FIG. 17, results obtained near the middle of the air gap for the first coil arrangement 2710 and the second coil arrangement 2720 of the coil arrangement 2700 illustrated in FIG. 16 are shown. Accordingly, the magnetic flux is strengthened in the radial direction at the center of the air gap between the first coil arrangement 2710 and the second coil arrangement 2720, but the magnetic flux in the axial or tangential direction is relatively scarce.

Figure 18:
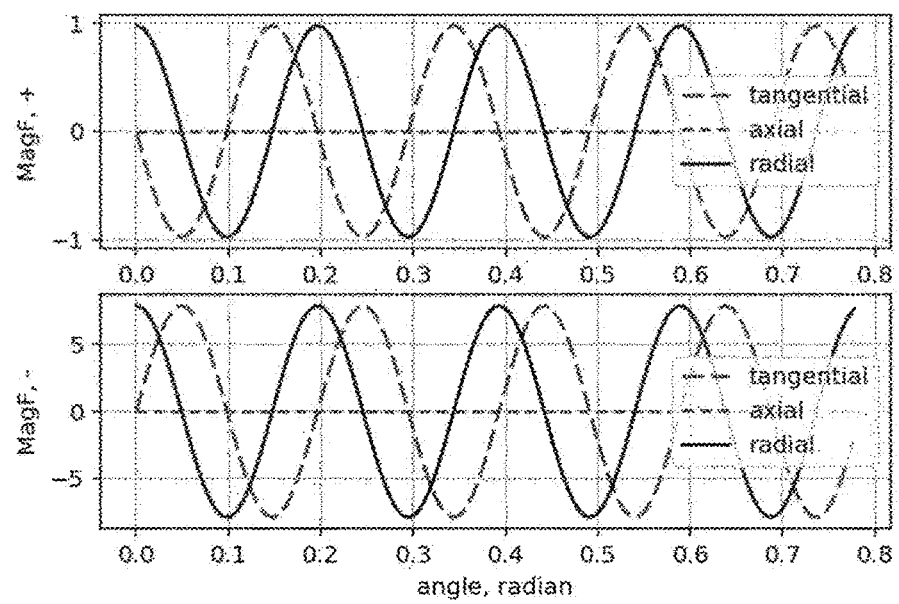
FIG. 18 is a simulation result diagram for a three-dimensional structure applied to a coil arrangement of a stator and a mover according to an embodiment of the present invention.

FIG. 18 is a simulation result diagram for a structure to which a three-dimensional structure of a coil arrangement according to an embodiment of the present invention is applied.

Referring to FIG. 18, results obtained from the first coil arrangement 2710 and the second coil arrangement 2720 of the coil arrangement 2700 illustrated in FIG. 16 in the vicinity of the region of interest of half the size of the air gap are shown. Therefore, it is confirmed that there is almost no magnetic flux leakage in all directions. Meanwhile, the region of interest means the inside including the first coil arrangement 2710 and the second coil arrangement 2720.

Figure 19:
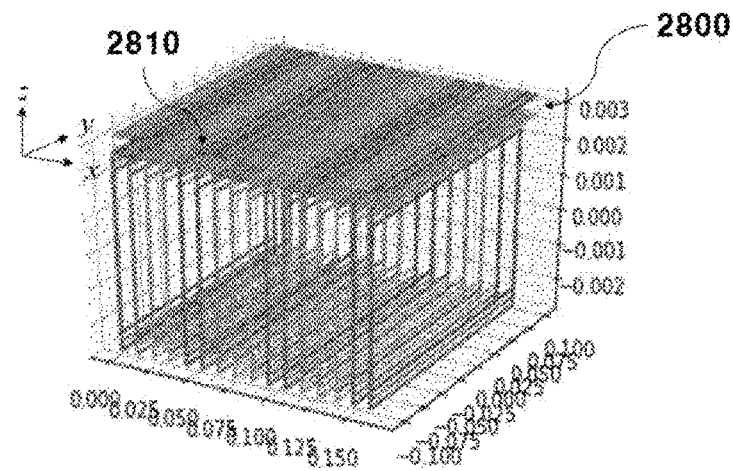
FIG. 19 is an exemplary schematic cross-sectional view illustrating a coil arrangement of a stator and a mover according to an embodiment of the present invention applied with a planar coil structure.

FIG. 19 is a schematic cross-sectional view illustrating a coil arrangement according to an embodiment of the present invention applied with a planar coil structure.

Referring to FIG. 19, a coil arrangement 2800 according to an embodiment of the present invention implements a planar coil structure periodically in the x-axis and z-axis directions. At this time, in the coil arrangement 2800, the magnetic field is strengthened in the + direction of the z axis, and the magnetic field is relatively weakened in the – direction.

Figure 20:
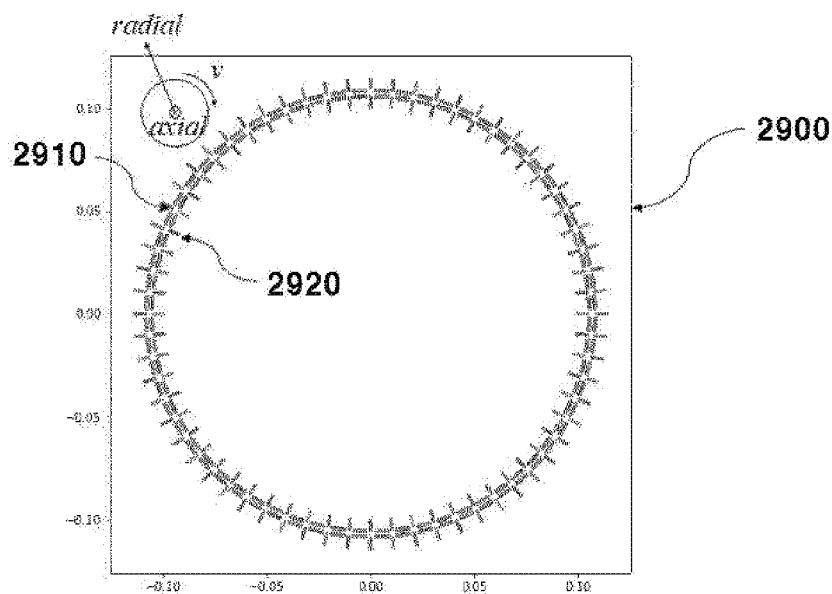
FIG. 20 is an exemplary schematic cross-sectional view illustrating a coil arrangement of the stator and the mover according to the embodiment of the present invention applied in a three-dimensional structure with a planar coil structure.

FIG. 20 is a schematic cross-sectional view illustrating a coil arrangement according to an embodiment of the present invention applied in a three-dimensional structure having a planar coil structure.

Referring to FIG. 20, a coil arrangement 2900 according to an embodiment of the present invention has a flat coil structure and is implemented in a circular shape. At this time, the coil arrangement 2900 according to the embodiment of the present invention is spaced apart by a predetermined distance in the radial direction, are implemented by a first coil arrangement 2910 and a second coil arrangement 2920 that are complementary to each other.

Figure 21:
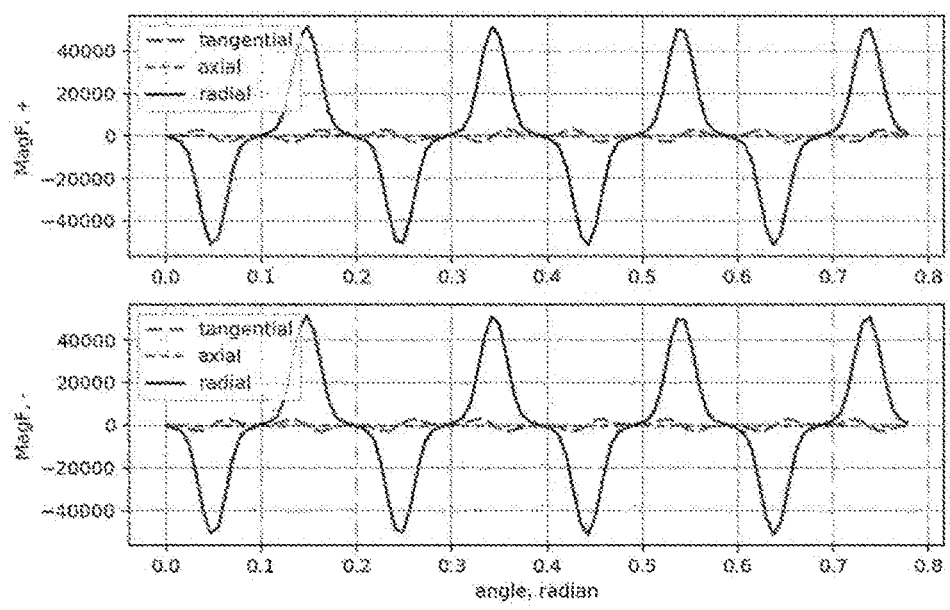
FIG. 21 is a simulation result diagram for a structure in which a coil arrangement of a stator and a mover according to an embodiment of the present invention is three-dimensionally applied with a planar coil structure.

FIG. 21 is a simulation result diagram for a structure in which a coil arrangement according to an embodiment of the present invention is three-dimensionally applied with a planar coil structure. Referring to FIG. 19, a strong magnetic field is shown in a radial direction near the center of the air gap in the region of interest, and the magnetic field is canceled to a degree that can be neglected in the axial direction or the tangential direction. Although not shown, as the results of FIG. 16, it was confirmed that there is almost no magnetic field leakage outside the region of interest.

A moving field electromagnetic machine using a coil arrangement according to an embodiment of the present invention strengthens a magnetic field on one side within a region of interest and almost eliminates a magnetic field leakage outside the region of interest. In addition, the moving field electromagnetic machine according to an embodiment of the present invention can minimize its size and weight, reduce core loss, and overcome performance limitations by not using or using a minimum iron core.

What is claimed is:

1. An electromagnetic machine comprising:
a stator including a multi-phase coil;
a mover including a multi-phase coil and spaced apart from the stator at a predetermined distance; and
a control unit configured to control a first magnetic field of the stator and a second magnetic field of the mover, independently,
wherein the control unit individually controls the first magnetic field and the second magnetic field with maintaining locking each other between the first magnetic field of the stator and the second magnetic field of the mover.

2. The electromagnetic machine according to claim 1, wherein the control unit controls the first magnetic field and the second magnetic field by controlling a first current applied to the multi-phase coil of the stator and a second current applied to the multi-phase coil of the mover.

3. The electromagnetic machine according to claim 2, wherein the control unit individually controls phases and amplitudes of the first current and the second current.

4. The electromagnetic machine according to claim 2, wherein the control unit applies the first current to the multi-phase coil of the stator or applies the second current to the multi-phase coil of the mover by using at least one method among a direct wiring method, a slip-ring method, and a wireless inductive coupling method.

5. The electromagnetic machine according to claim 1, wherein the control unit controls as the first magnetic field of the stator and the second magnetic field of the mover to be locked to each other, when the electromagnetic machine is initially driven.

6. The electromagnetic machine according to claim 1, wherein the control unit controls moving directions of the first magnetic field and the second magnetic field in the same direction or in the opposite direction.

7. The electromagnetic machine according to claim 1, wherein the mover is a rotor that is connected to a rotation shaft and rotates about the rotation shaft.

8. The electromagnetic machine according to claim 7, wherein the control unit sends commands to power supply to generate signals such that desired torque and speed of the rotation shaft.

9. The electromagnetic machine according to claim 1, wherein the electromagnetic machine is a linear electromagnetic machine or a rotating electromagnetic machine.

10. The electromagnetic machine according to claim 1, wherein the stator includes a first coil arrangement,
wherein the mover includes a second coil arrangement formed to be spaced apart from the first coil arrangement by a predetermined distance and having a mirror image in a spaced apart direction,
wherein the first coil arrangement includes at least one first half period and at least one second half period formed adjacent to each other,
wherein the first half period includes at least two coils having different current flowing directions, and
wherein the first half period and the second half period have mirror images in adjacent directions.

11. The electromagnetic machine according to claim 10, wherein a direction of the magnetic field formed between the two coils forming the first half period and a direction of the magnetic field formed between the two coils forming the second half period are opposite to each other.

12. The electromagnetic machine according to claim 10, wherein the first half period comprises:
a first layer adjacent to the second coil arrangement and comprising a first layer coil structure comprising at least two coils having different current flowing directions;
a second layer disposed on an upper portion of the first layer and comprising a second layer coil structure having a same current flowing direction as the first layer coil structure of the first layer but located more outwardly than the first layer coil structure; and
a third layer disposed on an upper portion of the second layer and comprising a third layer coil structure having a current flowing direction opposite to the second layer coil structure but located more inwardly than the second layer coil structure.

13. The electromagnetic machine according to claim 12, wherein the first half period further comprises:
a fourth layer disposed on an upper portion of the third layer and comprising a fourth layer coil structure having a same current flowing direction as the third layer coil structure but located more outwardly than the third layer coil structure.

14. The electromagnetic machine according to claim 10, wherein the first half period comprises:
a lower layer adjacent to the second coil arrangement and comprising a lower layer coil structure comprising at least two coils having different current flowing direction from each other; and
an upper layer disposed on an upper portion of the lower layer and comprising a upper layer coil structure having a current flowing direction opposite to the lower layer coil structure.

15. The electromagnetic machine according to claim 10, wherein the first coil arrangement comprises:
a plurality of first half periods; and
a plurality of second half periods,
wherein the first half periods and the second half periods are periodically formed in adjacent directions.

16. The electromagnetic machine according to claim 10, wherein the first coil arrangement or the second coil arrangement has a length being extended according to the current flowing directions, and comprises a segmented toroid current distribution or a segmented solenoid current distribution.

17. A magnetic field synchronously coupled (field locked) dual excitation electromagnetic machine system comprising the electromagnetic machine of claim 1.

18. An electromagnetic machine comprising:
a stator including a multi-phase coil;
a mover including a multi-phase coil and spaced apart from the stator at a predetermined distance; and
a control unit configured to control a first magnetic field of the stator and a second magnetic field of the mover, independently,
wherein the control unit controls the first magnetic field of the stator and the second magnetic field of the mover to be locked to each other, when the electromagnetic machine is initially driven.

19. An electromagnetic machine comprising:
a stator including a multi-phase coil;
a mover including a multi-phase coil and spaced apart from the stator at a predetermined distance; and
a control unit configured to control a first magnetic field of the stator and a second magnetic field of the mover, independently,
wherein the stator includes a first coil arrangement,
wherein the mover includes a second coil arrangement formed to be spaced apart from the first coil arrangement by a predetermined distance and having a mirror image in a spaced apart direction,
wherein the first coil arrangement includes at least one first half period and at least one second half period formed adjacent to each other,
wherein the first half period includes at least two coils having different current flowing directions, and
wherein the first half period and the second half period have mirror images in adjacent directions.

* * * * *